(12) United States Patent
Kim et al.

(10) Patent No.: US 12,144,040 B2
(45) Date of Patent: Nov. 12, 2024

(54) ELECTRONIC DEVICE AND OPERATION METHOD THEREOF

(71) Applicant: Samsung Electronics Co., Ltd., Suwon-si (KR)

(72) Inventors: Jinho Kim, Suwon-si (KR); Minji Kim, Suwon-si (KR); Jaejun Sim, Suwon-si (KR); Geunyoung Yu, Suwon-si (KR); Minju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 17/530,093

(22) Filed: Nov. 18, 2021

(65) Prior Publication Data
US 2022/0159754 A1    May 19, 2022

Related U.S. Application Data

(63) Continuation of application No. PCT/KR2021/016778, filed on Nov. 16, 2021.

(30) Foreign Application Priority Data

Nov. 18, 2020  (KR) .................. 10-2020-0154544

(51) Int. Cl.
| | | |
|---|---|---|
| *H04W 76/14* | (2018.01) | |
| *H04W 60/04* | (2009.01) | |
| *H04W 76/25* | (2018.01) | |
| *H04W 84/12* | (2009.01) | |

(52) U.S. Cl.
CPC .......... *H04W 76/14* (2018.02); *H04W 60/04* (2013.01); *H04W 76/25* (2018.02); *H04W 84/12* (2013.01)

(58) Field of Classification Search
CPC ...... H04W 76/14; H04W 76/25; H04W 60/04
See application file for complete search history.

(56) References Cited

U.S. PATENT DOCUMENTS

| | | |
|---|---|---|
| 9,826,116 B2 | 11/2017 | Park et al. |
| 10,032,260 B2 | 7/2018 | Choi et al. |

(Continued)

FOREIGN PATENT DOCUMENTS

| | | |
|---|---|---|
| CN | 107426726 | 12/2017 |
| JP | 2019-185757 | 10/2019 |

(Continued)

OTHER PUBLICATIONS

Search Report and Written Opinion dated Sep. 15, 2022 issued in International Patent Application No. PCT/KR2022/007036.

(Continued)

*Primary Examiner* — Kevin M Cunningham
(74) *Attorney, Agent, or Firm* — Nixon & Vanderhye, P.C.

(57) ABSTRACT

Provided is an electronic device including a Wi-Fi module and a processor. The Wi-Fi module includes circuitry including a first communication interface operating as a Wi-Fi station and configured to perform communication, and a second communication interface configured to perform communication based on Wi-Fi Direct. The processor is configured to execute at least one instruction. The processor is configured to: control the Wi-Fi module to set an operation mode of the second communication interface to a first mode for performing communication by operating as the Wi-Fi station, and perform communication connection with a second access point (AP) via the second communication interface in the first mode while connection with a first AP is maintained through the first communication interface.

20 Claims, 26 Drawing Sheets

(56) References Cited

U.S. PATENT DOCUMENTS

| | | | |
|---|---|---|---|
| 10,039,045 B2 | 7/2018 | Sun et al. | |
| 10,172,178 B2 | 1/2019 | Park et al. | |
| 10,212,641 B2 | 2/2019 | Sun et al. | |
| 10,855,879 B2 | 12/2020 | Park et al. | |
| 10,966,268 B2 | 3/2021 | Jung et al. | |
| 2013/0148149 A1* | 6/2013 | Park | G06F 3/1204 358/1.13 |
| 2015/0023334 A1 | 1/2015 | Suga | |
| 2018/0032837 A1 | 2/2018 | Hiroike et al. | |
| 2019/0053311 A1* | 2/2019 | Cariou | H04W 76/15 |
| 2021/0092257 A1 | 3/2021 | Jia et al. | |
| 2021/0204343 A1 | 7/2021 | Jung et al. | |
| 2021/0326090 A1* | 10/2021 | Sugawara | G06F 3/1204 |
| 2022/0365735 A1 | 11/2022 | Sugawara | |

FOREIGN PATENT DOCUMENTS

| | | |
|---|---|---|
| JP | 6700971 | 5/2020 |
| JP | 2020108122 | 7/2020 |
| KR | 10-0909070 | 7/2009 |
| KR | 10-2013-0029236 | 3/2013 |
| KR | 10-2013-0066553 | 6/2013 |
| KR | 10-2018-0059207 A | 6/2018 |
| KR | 10-2018-0059723 | 6/2018 |
| KR | 10-1867089 | 6/2018 |
| KR | 10-2183397 | 11/2020 |
| WO | 2016/122209 | 8/2016 |

OTHER PUBLICATIONS

Search Report and Written Opinion issued Feb. 18, 2022 in counterpart International Patent Application No. PCT/KR2021/016778.
Kim, Ronny Yongho et al, Multilink Management for Non-STR Soft AP, IEEE 802.11-20/1576r0, Oct. 5, 2020, 11 pages.
Extended Search Report dated Mar. 1, 2024 in European Patent Application No. 21895068.1.
Communication under Rule 71(3) EPC Intention to grant dated Sep. 25, 2024 in European Patent Application No. 21895068.1.

* cited by examiner

ELECTRONIC DEVICE AND OPERATION METHOD THEREOF

CROSS-REFERENCE TO RELATED APPLICATIONS

This application is a continuation of International Application No. PCT/KR2021/016778 designating the United States, filed on Nov. 16, 2021, in the Korean Intellectual Property Receiving Office and claiming priority to Korean Patent Application No. 10-2020-0154544, filed on Nov. 18, 2020, in the Korean Intellectual Property Office, the disclosures of which are incorporated by reference herein in their entireties.

BACKGROUND

Field

The disclosure relates to an electronic device capable of accessing a wireless communication network, and an operation method of the electronic device. For example, the disclosure relates to an electronic device capable to connect to an access point (AP) to access a Wi-Fi network, which is a wireless communication network, and an operation method of the electronic device.

Description of Related Art

Technologies in which an electronic device and another electronic device are connected to each other via a wireless communication network and a plurality of connected electronic devices are interlocked with each other to be used have been developed. A plurality of electronic devices connected to one another via a wireless communication network may be a display device (such as a television (TV)), a smartphone, a personal computer (PC), a personal digital assistant (PDA), a remote controller, a vehicle, a refrigerator, a washing machine, a watch, and the like. Examples of the plurality of electronic devices may include a server, a server device, and the like.

To enable a plurality of electronic devices that are not portable to be controllable by a technology such as an Internet of Things (IoT) platform, technologies for connecting, using, and/or controlling the plurality of electronic devices through a wireless communication network have been developed.

For example, the IoT may refer, for example, to all things (for example, an electronic device) such as a display device (such as, a TV, a smartphone, a PC, a vehicle, a refrigerator, a washing machine, a drying machine, an air conditioner, a heating device, and a watch connected to a wireless network. Usage of the IoT makes it possible for a plurality of electronic devices to exchange data, process data, and be automatically driven. For example, a user may control a TV, a heating device, and the like located in a house by using a smartphone outside the house.

To implement an IoT environment, a plurality of electronic devices should be registered in a server for providing an IoT platform, and the server and the plurality of electronic devices should maintain a communicable state therebetween.

As described above, a wireless communication network is used to establish an IoT environment to connect the plurality of electronic devices to one another. A wireless local area network (WLAN) for establishing a network is a representative example of the wireless communication network. The WLAN is referred to as a wireless LAN in Korean and this term is used interchangeably with 'Wi-Fi'.

In order for the plurality of electronic devices to be included in the IoT platform, each of the plurality of electronic devices should be connected to and registered in the server for providing the IoT platform, through an access point (AP). The AP is a piece of equipment that transmits or receives wireless data to or from each of the plurality of electronic devices and transmits the transmitted or received wireless data to a wired network through an Ethernet port, and may be referred to as a wired/wireless router.

Accordingly, there is a need for a method and apparatus for quickly and conveniently connecting an electronic device to an AP and connecting and registering an electronic device to a predetermined server through the AP.

SUMMARY

Embodiments of the disclosure provide an electronic device capable of accessing an access point (AP) included in another electronic device while maintaining a communication connection with an AP accessed by the electronic device without discontinuity, and an operation method of the electronic device.

Embodiments of the disclosure provide an electronic device including a Wi-Fi module and capable of accessing an AP included in another electronic device while maintaining a communication connection with an AP accessed by the electronic device without discontinuity, and an operation method of the electronic device.

Embodiments of the disclosure provide an electronic device including a Wi-Fi module and configured to access an AP included in another electronic device while maintaining a communication connection with an AP accessed by the electronic device without discontinuity, to thereby support the other electronic device to be registered in an Internet of Things (IoT) server, and an operation method of the electronic device.

An electronic device according to an example embodiment of the disclosure includes: a Wi-Fi module comprising circuitry including a first communication interface operating as a Wi-Fi station and configured to perform communication, a second communication interface configured to perform communication based on Wi-Fi Direct, and a processor configured to execute at least one instruction. The processor may be further configured to: control the Wi-Fi module to set an operation mode of the second communication interface to a first mode for performing communication by operating as the Wi-Fi station, and perform communication connection with a second access point (AP) via the second communication interface in the first mode, while connection with a first AP is being maintained through the first communication interface.

The processor may be further configured to: change the operation mode of the second communication interface from a second mode for performing communication based on Wi-Fi Direct to the first mode, in response to a first device including the second AP being searched.

The processor may be further configured to perform a scan for searching for an external device including an activated AP at preset time intervals and, based on the second device, which is the activated AP, being found, change the operation mode of the second communication interface from the second mode to the first mode.

The electronic device according to an example embodiment of the disclosure may further include: a user interface configured to receive an input. The processor may be further configured to: perform a scan for searching for an external device including an activated AP, in response to an input requesting searching of the external device received through the user interface, and, based on a first device including the second AP being found as a result of the scan, change the operation mode of the second communication interface from the second mode to the first mode.

The electronic device according to an example embodiment of the disclosure may further include: a user interface configured to receive an input. The processor may be further configured to: control execution of a scan for searching for an external device including an activated AP in response to an input requesting searching of the external device received through the user interface, and, based on a first device including the second AP being found as a result of the scan, control a user interface screen image for connection with respect to the second AP to be output. In response to an input corresponding to the user interface screen image, the processor may be further configured to obtain information necessary for the connection with respect to the second AP.

The processor may be further configured to: perform a scan searching for an external device including an activated AP using the first communication interface connected to the first AP. Based on the second AP being found as a result of the scan, the processor may be further configured to: disable a Peer-to-Peer (P2P) listen operation performed by the second communication interface to stand by communication connection based on Wi-Fi Direct, and change the operation mode of the second communication interface from the second mode to the first mode.

The processor may be further configured to: control the Wi-Fi module so that, based on the first communication interface being in the first mode and the second communication interface being in a second mode for performing communication based on the Wi-Fi Direct, searching for the first device including the second AP is performed through the first communication interface.

Based on communication connection with the second AP being completed through the second communication interface, the processor may be further configured to control Wi-Fi connection information corresponding to an AP to which the first device is to be connected through the second communication interface to be transmitted to the first device.

The processor may be further configured to control server registration information used by the first device to be registered in a server to be transmitted to the second device through the second communication interface.

Based on transmission of the Wi-Fi connection information being completed, the processor may be further configured to disconnect communication connection with the second AP through the second communication interface.

Based on communication connection with the second AP through the second communication interface being released, the processor may be further configured to change the operation mode of the second communication interface from the second mode to the first mode, and the second communication interface may be configured to perform a P2P listen operation in order to stand by communication connection based on the Wi-Fi Direct, in the second mode.

Based on changing the operation mode of the second communication interface being completed, the processor may be further configured to: perform a search for the first device through the second communication interface, and, based on the first device being found through the second communication interface, perform the communication connection with the second AP through the second communication interface.

The electronic device may operate as a mediator within an Internet of Things (IoT) platform, the first device may operate as an enrollee that is an electronic device to be registered in an IoT server in order to implement the IoT platform, and the first AP may operate as an enroller that supports communication between the server and at least one of the electronic device or the first device.

The first AP and the second AP may be included in a multi-band AP device that performs Wi-Fi communication in each of a plurality of frequency bands.

A method of operating an electronic device performing communication including a Wi-Fi module comprising circuitry including a first communication interface operating as a Wi-Fi station and configured to perform communication, and a second communication interface configured to perform communication based on Wi-Fi Direct, according to an example embodiment of the disclosure, includes: setting an operation mode of the second communication interface to be a first mode for performing communication by operating as the Wi-Fi station; maintaining connection with a first access point (AP) through the first communication interface; and performing communication connection with a second AP through the second communication interface in the first mode while the connection with the first AP is maintained through the first communication interface.

The setting of the operation mode of the second communication interface to be the first mode may include changing, in response to a first device including the second AP being searched, the operation mode of the second communication interface from a second mode for performing communication based on the Wi-Fi Direct to the first mode.

The setting of the operation mode of the second communication interface to be the first mode may include performing a scan for searching for an external device including an activated AP at preset time intervals; and, based on a first device including the second AP, which is the activated AP, being found as a result of the scan, changing the operation mode of the second communication interface from the second mode to the first mode.

The setting of the operation mode of the second communication interface to be the first mode may include receiving an input requesting searching of an external device; searching for an external device including an activated AP, in response to the input; and, based on a first device including the second AP, which is the activated AP, being found as a result of the searching, changing the operation mode of the second communication interface from the second mode to the first mode.

The method may further include: performing a scan for searching for the external device including an activated AP using the first communication interface connected to the first AP, in response to an input requesting searching of an external device; based on a first device including the second AP being found as a result of the scan, outputting a user interface screen image for connection with respect to the second AP; and, in response to receiving an input corresponding to the user interface screen image, obtaining information necessary for the connection with respect to the second AP.

The setting of the operation mode of the second communication interface to be the first mode may include: performing a scan searching for an external device including an activated AP using the first communication interface connected to the first AP; based on a first device including the second AP being found as a result of the scan, disabling a P2P listen operation performed by the second communication interface to stand by communication connection based on the Wi-Fi Direct; and changing the operation mode of the second communication interface from the second mode to the first mode.

The method may further include, based on the communication connection with the second AP being completed through the second communication interface, transmitting, to a first device including the second AP, Wi-Fi connection information corresponding to an AP to which the first device is to connect.

The method may further include transmitting, to the first device through the second communication interface, server registration information used by the first device to be registered in a server.

The method may further include, based on transmission of the Wi-Fi connection information being completed, releasing communication connection with the second AP through the second communication interface.

In an electronic device and an operation method thereof, according to an example embodiment of the disclosure, an electronic device including a single Wi-Fi module may connect to an access point (AP) of another electronic device through the Wi-Fi module without disconnecting communication connection with an AP connected through a Wi-Fi communication network.

According to an example embodiment of the disclosure, when an electronic device serving as a mediator supports connection of an enrollee to an enroller, the electronic device as a mediator may connect to the enrollee via a Wi-Fi network while maintaining communication connection with the enroller based on the Wi-Fi network. Thus, the electronic device according to an example embodiment of the disclosure may connect to the Wi-Fi network without discontinuity, thereby increasing control reliability of an IoT platform.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
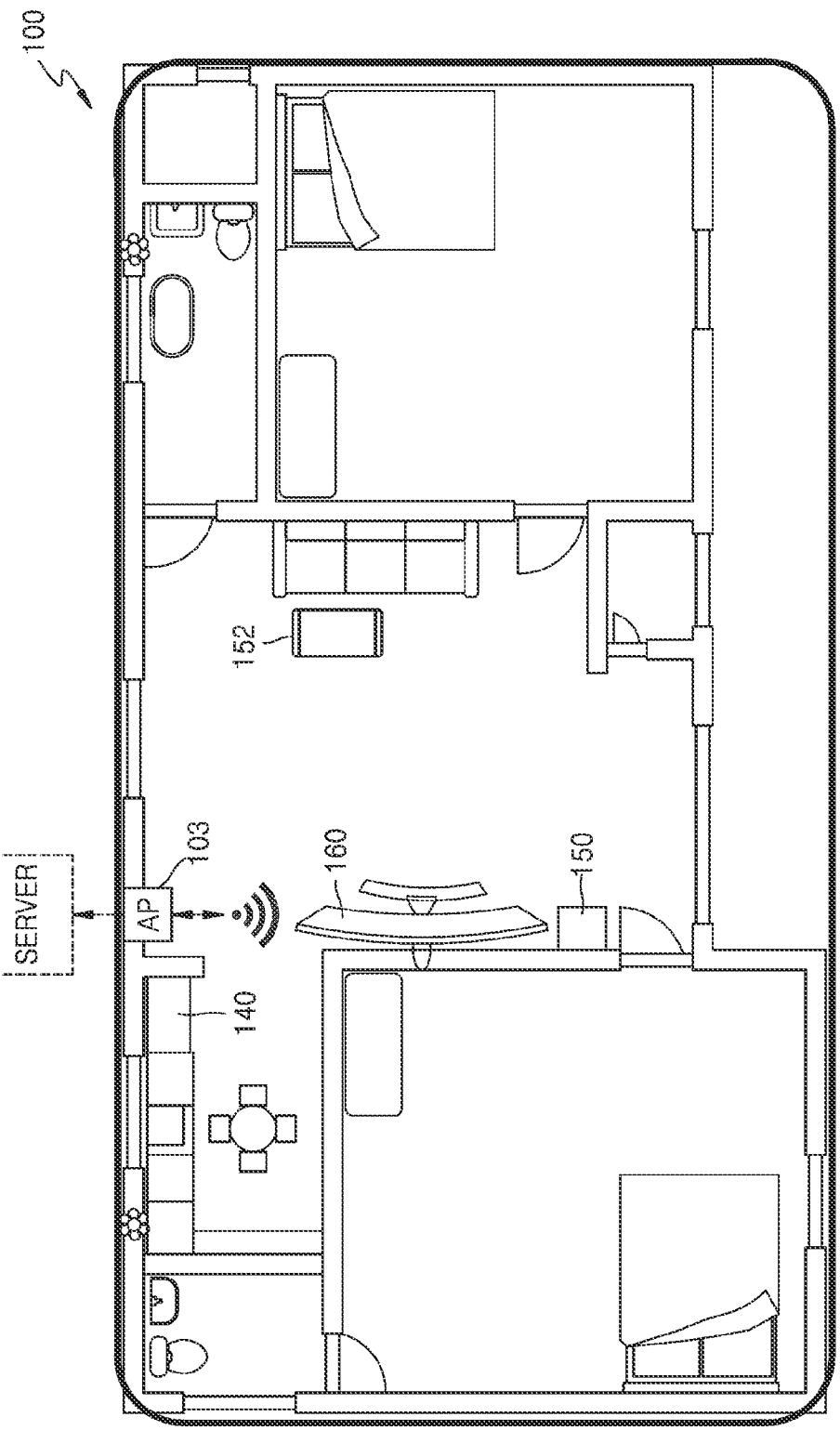
FIG. 1 is a diagram illustrating an example layout including Internet of Things (IoT) technology according to various embodiments.

Throughout the disclosure, the expression "at least one of a, b or c" indicates only a, only b, only c, both a and b, both a and c, both b and c, all of a, b, and c, or variations thereof.

Embodiments of the disclosure will now be described in greater detail with reference to the accompanying drawings. The disclosure may, however, be embodied in many different forms and should not be construed as being limited to the embodiments set forth herein. In the drawings, parts irrelevant to the description may be omitted for the simplicity of explanation, and like numbers refer to like elements throughout.

Throughout the disclosure, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this specification, specify the presence of stated elements, but do not preclude the presence or addition of one or more other elements.

Phrases such as "according to some embodiment" or "according to an embodiment" appearing in various places in this disclosure do not necessarily all refer to the same embodiment.

Various embodiments may be represented by functional block configurations and various processing operations. Some or all of these functional blocks may be implemented using various numbers of hardware and/or software configurations that perform specific functions. For example, the functional blocks of the disclosure may be implemented by one or more microprocessors, or by circuit configurations for performing an intended function. For example, the functional blocks of the disclosure may be implemented in various programming or scripting languages. The functional blocks may be implemented as algorithms executed in one or more processors. The disclosure may employ the conventional art for electronic configuration, signal processing, and/or data processing, for example. Terms such as modules and configurations may be used broadly and are not limited to mechanical and physical configurations.

In addition, connecting lines or connecting members between the components shown in the drawings only exemplify functional connections and/or physical or circuit connections. In an actual device, a connection between components may be represented by various functional connections, physical connections, or circuit connections that are replaceable or added.

An expression "at least one of A or B" indicates "A or B" or "A and B".

An electronic device according to an embodiment of the disclosure may include any electronic device connectable to another electronic device via a wireless communication network.

An electronic device according to an embodiment of the disclosure may include any electronic device connectable to another electronic device via a wireless communication network.

For example, the electronic device according to an embodiment of the disclosure may be implemented in various forms, such as, for example, and without limitation, a TV, a digital TV, a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, a wearable device, a watch, or the like. An electronic device according to an embodiment of the disclosure may include a digital appliance (DA) such as, for example, and without limitation, a refrigerator, an air purifier, a washing machine, a dryer, a cleaner, a heating device, a clock, an alarm device, or the like. The electronic device may be a fixed electronic device arranged at a fixed location or a mobile electronic device in a portable form, and may be a digital broadcast receiver capable of receiving a digital broadcast.

A case where an electronic device according to an embodiment of the disclosure is a display device (e.g., a TV) that includes a display to visually output image data will be described and illustrated by way of non-limiting example.

FIG. 1 is a diagram illustrating an example layout of Internet of Things (IoT) technology according to various embodiments.

For example, an electronic device according to an embodiment of the disclosure is an electronic device capable of being connected to at least one other electronic device via a wireless communication network, and may be an electronic device included in an IoT platform.

For example, to implement the IoT platform, an electronic device according to an embodiment of the disclosure may transmit or receive certain data to or from at least one adjacent electronic device via a communication network, be paired with at least one adjacent electronic device, remotely control at least one adjacent electronic device, or be remotely controlled by at least one adjacent electronic device. The communication network may be configured of at least one of a wired communication network or a wireless communication network. For example, the communication network used to implement IoT may be mobile communication (for example, wireless broadband (Wibro), world interoperability for microwave access (Wimax), code division multiple access (CDMA), wideband CDMA (WCDMA), 3rd generation (3G), 4G, or 5G), short distance communication (for example, near field communication (NFC), Bluetooth, or wireless local area network (WLAN) (Wi-Fi)), and/or low power wide area communication (for example, TV white space (TVWS) or weightless).

FIG. 1 illustrates a case where at least one electronic device included in a house 100 is included in the IoT platform.

Referring to FIG. 1, at least one of a refrigerator 140, an air conditioner 150, an electronic device 160, and/or a tablet PC 152, which is at least one electronic device located within the house 100, may access an access point (AP) via a Wi-Fi network and implement an IoT environment.

In order for the at least one electronic device located within the house 100 (for example, 140, 150, 152, and 160) to be included in the IoT environment, each of the at least one electronic device (for example, 140, 150, 152, and 160) needs to be connected to the AP 103. The at least one electronic device (for example, 140, 150, 152, and 160) connected to the AP 103 may be connected to and registered in a server 101 via the AP 103.

The AP 103 serves as a bridge between a wireless communication network and a wired communication network. For example, the AP 103 may connect a wired network to a wireless network by serving as a base station in a wireless LAN. For example, the AP 103 may serve as a bridge that connects a wireless LAN to which the at least one electronic device (for example, 140, 150, 152, and 160) has been connected to a wired communication network to which an external electronic device (for example, the server 101) is connected. The wired communication network connecting the server 101 to the AP 103 is a communication network for connection of an AP 103 to a distribution station (DS), and may be a mobile communication network or Internet network, which is not shown in FIG. 1.

In the accompanying drawings including FIG. 1, the at least one electronic device (for example, 140, 150, 152, and 160) connected to the AP 103 may be referred to as a client device or a station.

The server 101 is connected to one or more electronic devices located at a remote location in order to support an IoT platform, and may be a cloud server or a cloud server device. A server supporting the IoT platform may be referred to as an IoT cloud server.

A member in the house 100 may be a user of the electronic device 160. The user may own his or her mobile device (not shown). When the user holding his or her mobile device (not shown) is located far from the house 100, the mobile device (not shown) and the electronic device 160 may be connected to each other via a communication network including a Wi-Fi network. The mobile device (not shown) may be a mobile computing device such as a wearable device, a smartphone, a tablet PC, a personal digital assistant (PDA), a laptop computer, a media player, a micro server, or a global positioning system (GPS) device.

As described above, the mobile device (not shown) of the user located far from the house 100 and the electronic device 160 may be connected to each other by the IoT platform provided by the server 101. In this case, the electronic device 160 may operate under the control by the mobile device (not shown), and may perform an operation automatically required under the control by the mobile device (not shown). In order for an electronic device existing within the house 100 to be included in the IoT platform, the electronic device existing within the house 100 needs to be registered in and connected to the server 101 via the AP 103.

Operations for registering another electronic device in the server 101 for providing the IoT platform using an electronic device will now be described in greater detail below with reference to FIG. 2.

Figure 2:
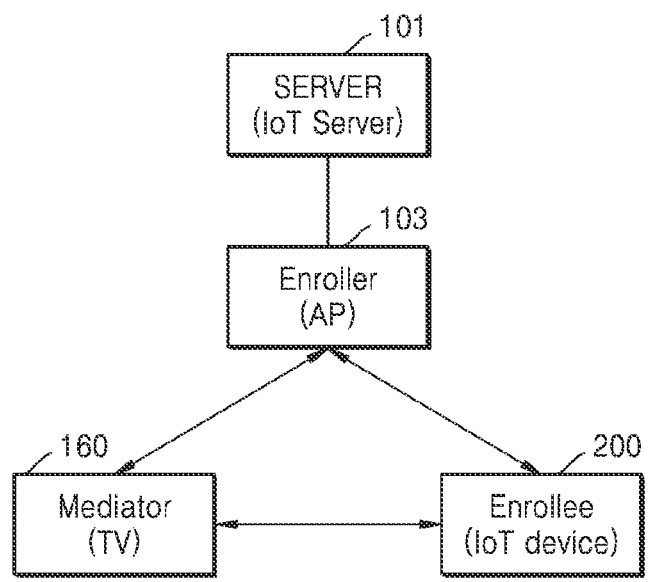
FIG. 2 is a block diagram illustrating an example communication connection between a server, an access point (AP), and at least one electronic device, for implementing an IoT platform according to various embodiments.

FIG. 2 is a block diagram illustrating an example communication connection between a server, an AP, and at least one electronic device, for implementing the IoT platform according to various embodiments. Components of FIG. 2 that are the same as or similar to the components of FIG. 1 are indicated by the same reference numerals or characters.

To implement the IoT platform, a server (for example, an IoT cloud), an enroller, and an enrollee may be connected to one another by a communication network.

The electronic device 160 such as a TV is an electronic device for which communication connection to the AP 103 has been completed, and may operate as a mediator. For example, the mediator may refer to an electronic device that supports an enrollee device to be connected to a Wi-Fi network which is a target.

The enrollee device is an electronic device desiring to be included in the IoT platform, and may refer to an electronic device that is to be registered in the server 101. An enroller device is a device including a Wi-Fi network which is a target, and may be an AP. The enroller may be connected to the enrollee.

Referring back to FIG. 1, for example, when the air conditioner 150, which is a digital appliance (DA) newly purchased by the user, enters the house 100, the air conditioner 150 needs to be registered in the server 101 as the IoT cloud server so that the air conditioner 150 is included in the IoT platform. To this end, the electronic device 160, which is a mediator, may perform communication connection with the air conditioner 150 via the Wi-Fi network, and may support the air conditioner 150 to be connected to and registered in the server 101 via the AP 103. In the above-described example, the air conditioner 150 may correspond to the enrollee.

FIG. 2 illustrates a case where the AP 103, the electronic device 160 such as a display (e.g., a TV), and an IoT device 200, which is an electronic device to be registered, serve as an enroller, a mediator, and an enrollee, respectively. A case where the electronic device 160 is an electronic device according to an embodiment of the disclosure will now be described and illustrated, and the IoT device 200 corresponding to the enrollee is a first device to be described below will now be described and illustrated.

In general, an electronic device includes one Wi-Fi module to perform communication according to a Wi-Fi communication network. The Wi-Fi module may refer to a Wi-Fi chipset that physically performs communication based on Wi-Fi. In general, one Wi-Fi module can connect to one AP, and cannot connect to two different APs at the same time. Thus, when an electronic device including one Wi-Fi module connects to one AP, the electronic device needs to disconnect the previous connection to the AP in order to newly connect to another AP. In other words, a conventional electronic device including one Wi-Fi module can connect to a new AP only by disconnecting the connection to the previous AP.

For example, the IoT device 200 including one Wi-Fi module may activate a Software enabled Access Point (Soft AP) to connect to a mediator in order to perform an enrollee operation. In general, the electronic device 160 operating as a mediator searches for a Soft AP using a Wi-Fi interface (not shown) connecting to a Home AP or the like, and connects to a found Soft AP. An operation of searching for an activated AP (for example, an activated Soft AP) may be referred to as a scan operation. The scan operation may refer to an operation of searching for an external device including an activated AP.

In this case, in order for the electronic device 160 to connect to the Soft AP, the electronic device 160 needs to disconnect previous connection to the Home AP and then needs to connect to the Soft AP via the Wi-Fi interface (not shown). In other words, for new communication connection with the Soft AP, connection to the existing home AP needs to be disconnected, and, due to the disconnection of the connection to the existing home AP, the electronic device 160 may not temporally perform communication connection with the server 101 supporting the IoT platform.

However, in the IoT platform, in order for an electronic device to be remotely controlled in response to an external control request, the electronic device needs to be always in connection with an AP used to implement the IoT platform. For example, when an electronic device disconnects connection with an AP used to implement the IoT platform, the electronic device may not receive an external control request. Accordingly, remote control according to the IoT platform may not be achieved.

According to an embodiment of the disclosure, to support connection of an enrollee to an enroller, the electronic device as a mediator may connect to the enrollee via the Wi-Fi network while maintaining communication connection between the electronic device as the mediator and the enroller. Thus, an electronic device according to an embodiment of the disclosure may always connect to the Wi-Fi network without any discontinuity and accordingly may increase control reliability of the IoT platform.

An electronic device according to an embodiment of the disclosure may be an electronic device corresponding to a mediator, and will now be described in greater detail below with reference to FIGS. 3 through 20.

Figure 3:
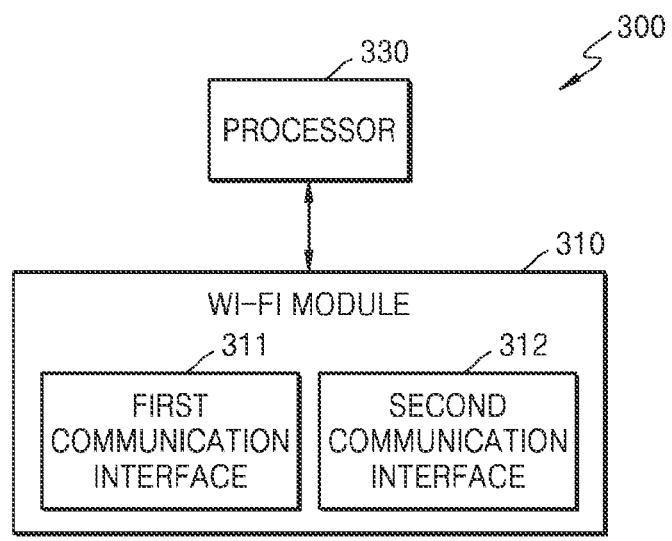
FIG. 3 is a block diagram illustrating an example configuration of an electronic device according to various embodiments.

FIG. 3 is a block diagram illustrating an example configuration of an electronic device 300 according to various embodiments. The electronic device 300 of FIG. 3 may correspond to the electronic device (for example, 140, 150, 152, or 160) of FIG. 1, and may correspond to the electronic device 160 of FIG. 2. Accordingly, descriptions of the electronic device 300 that are the same as or similar to those made with reference to FIGS. 1 and 2 may not be repeated herein.

Referring to FIG. 3, the electronic device 300 according to an embodiment of the disclosure includes a Wi-Fi module (e.g., including wi-fi circuitry) 310 and a processor (e.g., including processing circuitry) 330. As described above with reference to FIG. 2, the electronic device 300 may serve as a mediator.

The electronic device 300 includes a Wi-Fi module 310 and a processor 330 executing at least one instruction to perform at least one operation. The Wi-Fi module 310 includes a first communication interface (e.g., including communication circuitry) 311 operating as a Wi-Fi station and performing communication, and a second communication interface (e.g., including communication circuitry) 312 performing communication based on Wi-Fi Direct. The processor 330 controls the Wi-Fi module 310 to set an operation mode of the second communication interface 312 to be a first mode for performing communication by operating as the Wi-Fi station, and perform communication connection with a second AP via the second communication interface 312 in the first mode, while connection with a first AP is being maintained through the first communication interface 311.

The Wi-Fi station may refer to an operation mode of receiving a wireless signal according to a Wi-Fi standard. For example, the Wi-Fi station may be an operation mode of connecting to an AP (for example, a Home AP) of the Wi-Fi network and receiving a wireless signal from the connected AP. The first mode may refer to an operation mode in which the Wi-Fi module 310 operates as the Wi-Fi station. A second mode, which will be described later, may refer to an operation mode in which the Wi-Fi module 310 performs communication based on Wi-Fi Direct.

The operation mode of each of the first and second communication interfaces 311 and 312 included in the Wi-Fi module 310 may be the first mode or the second mode. For example, the operation mode of each of the first and second communication interfaces 311 and 312 may be a first mode of performing wireless communication by connecting to an AP by operating as the Wi-Fi station or a second mode of performing direct communication (for example, P2P communication) between devices without connecting to an AP, based, for example, on Wi-Fi Direct.

For example, the Wi-Fi module 310 may include one interface (for example, the first communication interface 311) operating as the Wi-Fi station, and one interface (for example, the second communication interface 312) performing communication based on Wi-Fi Direct for integrated communication.

The communication based on Wi-Fi Direct is device to device communication, and may refer to communication in which the electronic device 300 and another external device (not shown) perform external integrated transmission or reception with respect to a wireless signal according to the Wi-Fi Direct standard. Wi-Fi Direct is Wi-Fi based technology defined and certified as a standard in Wi-Fi Alliance, and thus a detailed description thereof may not be provided here. The communication based on Wi-Fi Direct may provide a Peer-to-Peer (P2P) protocol connection method in which direction communication is performed between terminals without network infra equipment such as an AP or a router. The second mode may refer to an operation mode in which the Wi-Fi module 310 performs communication based on Wi-Fi Direct.

The first AP and the second AP are simply provided to refer to different APs, and do not refer to a specific AP. For example, the first AP may refer to an AP connected to the first communication interface 311. The first AP may be an AP that includes a Wi-Fi network used to transmit or receive a control signal or pieces of data based on the IoT platform.

The first AP may also be a Home AP, which is an AP of a Wi-Fi network in a space where the electronic device 300 is located.

The second AP may refer to an AP connected to the second communication interface 312 according to operations according to an embodiment of the disclosure. The second AP may be a Soft AP included in an electronic device desiring to be newly added to the IoT platform (for example, the first device).

According to an embodiment of the disclosure, the Wi-Fi module 310 includes an interface (for example, the first communication interface 311) relaying communication by operating as the Wi-Fi station, and an interface (for example, the second communication interface 312) relaying communication by operating to perform communication based on Wi-Fi Direct.

For example, the Wi-Fi module 310 may transmit and/or receive data through a Wi-Fi network. In other words, the Wi-Fi module 310 may be a communication module for connecting to a Wi-Fi network using a communication method defined in a Wi-Fi communication standard. The Wi-Fi module 310 may refer to a Wi-Fi chipset that transmits or receives a radio signal according to the Wi-Fi communication standard.

For example, the Wi-Fi module 310 may perform wireless communication based on the Wi-Fi network with the other electronic device (not shown), via an AP (not shown). The Wi-Fi module 310 may perform wireless communication with the other electronic device (not shown) through the Wi-Fi network using Wi-Fi Direct or a P2P method.

The processor 330 may include various processing circuitry and controls an operation intended to be performed, by executing the at least one instruction. The processor 330 may control overall operations of the electronic device 300. The processor 330 may control other components included in the electronic device 300 so that a certain operation is performed.

For example, the processor 330 may include an internal memory (not shown) and at least one processor (not shown) for executing stored at least one program. The internal memory (not shown) of the processor 330 may store one or more instructions. The processor 330 may perform a certain operation by executing at least one of the one or more instructions stored in the internal memory (not shown).

For example, the processor 330 may include RAM (not shown) storing a signal or data input from the outside of the electronic device 300 or being used as a storage area corresponding to various operations performed by the electronic device 300, ROM (not shown) storing a control program for controlling the electronic device 300 and/or a plurality of instructions, and at least one processor (not shown).

The processor 330 may include a graphics processing unit (GPU) (not shown) for graphic processing corresponding to video. The processor 330 may be implemented as a system on chip (SoC) into which a core (not shown) and the GPU (not shown) are integrated. The processor 330 may include multiple cores more than a single core. For example, the processor 330 may include a dual-core, triple-core, quad-core, hexa-core, octa-core, deca-core, dodeca-core, hexadecimal core, and the like.

The processor 330 may include, for example, and without limitation, a main central processing unit (CPU). For example, the processor 330 may control the electronic device 300 to perform a certain operation, after being waked up.

According to an embodiment of the disclosure, the electronic device 300 serving as a mediator may perform operations for supporting an enrollee to connect to an enroller. Accordingly, the processor 330 may control the Wi-Fi module 310 so that the electronic device 300 as a mediator connects to the enrollee via the Wi-Fi network while maintaining communication connection based on the Wi-Fi network with the enroller. The control by the processor 330 will be described later for example with reference to FIGS. 6 through 20.

Figure 4:
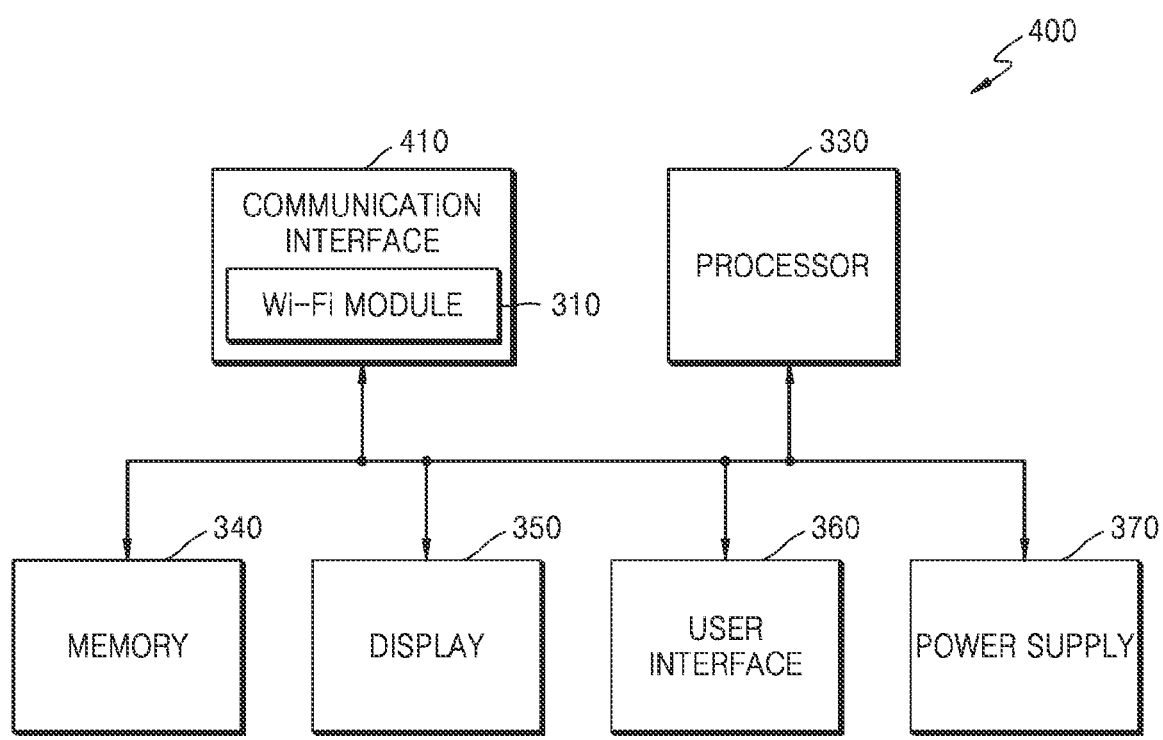
FIG. 4 is another block diagram illustrating an example configuration of an electronic device according to various embodiments.

FIG. 4 is a block diagram illustrating an example configuration of an electronic device 400 according to various embodiments. The electronic device 400 of FIG. 4 may correspond to the electronic device 300 of FIG. 3. Accordingly, descriptions of the electronic device 400 that are the same as or similar to those made with reference to FIG. 3 may not be repeated herein.

Referring to FIG. 4, the electronic device 400 may include a communication interface (e.g., including communication circuitry) 410 including the Wi-Fi module (e.g., including Wi-Fi circuitry) 310 described above with reference to FIG. 3. The electronic device 400 may further include at least one of a memory 340, a display 350, a user interface (e.g., including interface circuitry) 360, and/or a power supply 370, compared with the electronic device 300 of FIG. 3.

The communication interface 410 may include various communication circuitry and performs communication with an external electronic device (not shown) through at least one wired or wireless communication network. According to an embodiment of the disclosure, the communication interface 410 may communicate with the external electronic device (not shown). The external electronic device may be a server, and the communication interface 410 may perform communication with a server (not shown). The server (not shown) may be a server for providing the IoT platform or the IoT environment, and may be a content providing server, an Internet server, or the like. When the communication interface 410 communicates with the external electronic device (not shown), a wireless communication network through the AP (not shown) may be used, or communication relay of the server (not shown) may be used.

For example, the communication interface 410 may be formed in a form including at least one communication module, a communication circuit, and the like, and may transmit or receive data to or from the external electronic device through the communication module and/or the communication circuit.

For example, the communication interface 410 may include at least one short-range communication module (not shown) that performs communication according to a communication standard such as Bluetooth, Wi-Fi, Bluetooth Low Energy (BLE), NFC/RFID, Wi-Fi Direct, UWB, or ZIGBEE.

The communication interface 410 may further include a server (not shown) for supporting long-distance communication according to a long-distance communication standard, and a long-distance communication module (not shown) for performing communication. For example, the communication interface 410 may include a long-distance communication module (not shown) for performing communication via a network for Internet communication. The communication interface 410 may include a communication network following a communication standard such as 3G, 4G, 5G, and/or 6G.

The communication interface 410 may include a short-range communication module capable of receiving a control command from a remote controller (not shown), for example, an infrared (IR) communication module. In this case, the communication interface 410 may receive a control command from the remote controller (not shown). For example, the control command received from the remote controller (not shown) may include a turn-on or turn-off command.

The memory 340 may store at least one instruction. The memory 340 may store at least one instruction that the processor 330 executes. The memory 340 may store at least one program that the processor 330 executes. The memory 340 may store information or data that is used in an operation of the electronic device 400. The memory 340 may store content reproducible by the electronic device 400.

For example, the memory 340 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The electronic device 400 may be a display device including the display 350. The display device refers to any electronic device including a display capable of visually outputting information or content, and may exist in any of very various forms such as a TV, a digital TV, an electronic signage, a modular display, a tablet PC, a monitor, and a mobile device.

The display 350 visually outputs an image. For example, the display 350 may output an image corresponding to video data through a display panel (not shown) included in the display 350 so that a user visually recognize the video data.

The user interface 360 may include various interface circuitry and receive a user input for controlling the electronic device 400. The user interface 360 may include, but is not limited to, a touch panel for sensing a user's touch, a button for receiving a user's push operation, a wheel for receiving a user's rotation operation, a keyboard, and a dome switch.

The user interface 360 may include a voice recognition device (not shown) for voice recognition. For example, the voice recognition device may be a microphone, and the voice recognition device may receive a user's voice command or voice request. Accordingly, the processor 330 may control an operation corresponding to the voice command or voice request to be performed.

The user interface 360 may also include a motion detection sensor (not shown). For example, the motion detection sensor (not shown) may detect a motion of the electronic device 400 and receive the detected motion as a user input. The voice recognition device (not shown) and the motion detection sensor (not shown) may be included in the electronic device 400 as a module independent from the user interface 360, rather than being included in the user interface 360.

The power supply 370 may include various power supplying circuitry and supplies power to the internal components of the electronic device 400, under the control by the processor 330. For example, the power supply 370 may supply power that is input from an external power source, to the internal components of the electronic device 400, under the control by the processor 330. As another example, the power supply 370 may supply power that is output by one or more batteries (not shown) located in the electronic device 400, to the internal components of the electronic device 400, under the control by the processor 330.

Figure 5:
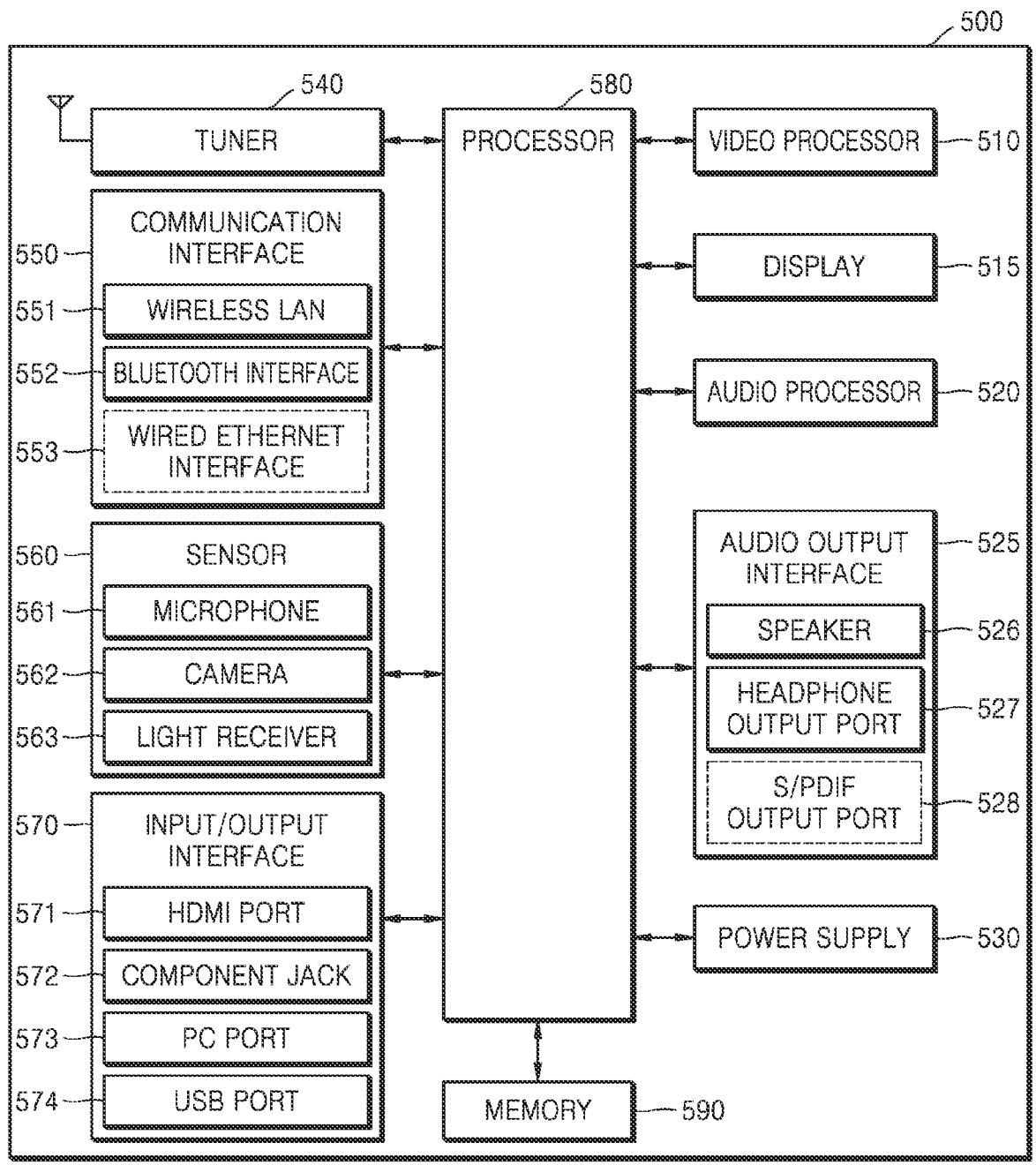
FIG. 5 is a block diagram illustrating an example configuration of a display device according to various embodiments.

FIG. 5 is a block diagram illustrating an example configuration of a display device 500 according to various embodiments. The display device 500 of FIG. 5 may correspond to the electronic device 300 of FIG. 3 or the electronic device 400 of FIG. 4. Accordingly, descriptions of the display device 500 that are the same as or similar to those made with reference to FIGS. 3 and 4 may not be repeated herein.

An electronic device according to an embodiment of the disclosure may be a display device, and FIG. 5 is a block diagram illustrating the display device 500 as an electronic device according to an embodiment of the disclosure.

Referring to FIG. 5, the display device 500 includes a video processor (e.g., including video processing circuitry) 510, a display 515, an audio processor (e.g., including audio processing circuitry) 520, an audio output interface (e.g., including audio output circuitry) 525, a power supply 530, a tuner 540, a communication interface (e.g., including communication circuitry) 550, a sensor 560, an input/output (I/O) interface (e.g., including input/output circuitry) 570, a processor (e.g., including processing circuitry) 580, and a memory 590.

The processor 580 may correspond to the processor 330 of FIGS. 3 and 4. The communication interface 550, the display 515, the power supply 530, and the memory 590 of the display device 500 may correspond to the communication interface 410, the display 350, the power supply 370, and the memory 340 of FIG. 4, respectively. A wireless LAN 551 included in the communication interface 550 may correspond to the Wi-Fi module 310 of FIGS. 3 and 4. Accordingly, descriptions of the display device 500 that are the same as or similar to those made with reference to FIGS. 3 and 4 may not be repeated herein.

The video processor 510 may include various video processing circuitry and processes video data that is received by the display device 500. The video processor 510 may perform a variety of image processing, such as decoding, scaling, noise filtering operation to filter noise in a received signal, frame rate transformation, and resolution transformation, on the received video data.

The processor 580 may include various processing circuitry and receive a write request with respect to the video data processed by the video processor 510, and may control the video data to be encrypted and written to a memory device (not shown) included in the processor 580 or the memory 590, for example, RAM (not shown).

According to an embodiment of the disclosure, the processor 580 may control a Wi-Fi module (not shown in FIG. 5 and corresponding to the Wi-Fi module 310 of FIG. 3) included in the wireless LAN 551 to set an operation mode of a second communication interface (not shown in FIG. 5 and corresponding to the second communication interface 312 of FIG. 3) included in the wireless LAN 551 to be the first mode for performing communication by operating as the Wi-Fi station, and perform communication connection with a second AP via a second communication interface in the first mode, while connection with a first AP is being maintained through a first communication interface (corresponding to the first communication interface 311 of FIG. 3) included in the wireless LAN 551.

The display 515 displays video included in a broadcasting signal received via the tuner 540 on the screen thereof, under the control by the processor 580. The display 515 may also display content (for example, a moving picture) that is input via the communication interface 550 or the I/O interface 570.

The display 515 may output an image stored in the memory 590 under the control by the processor 580. The display 515 may include a voice user interface (UI) (e.g., including a voice instruction guide) for performing a voice recognition task corresponding to voice recognition or a motion UI (e.g., including a user motion guide for motion recognition) for performing a motion recognition task corresponding to motion recognition.

The audio processor 520 may include various audio processing circuitry and processes audio data. The audio processor 520 may perform a variety of processing, such as decoding, amplification, or noise filtering operation, on the audio data. The audio processor 520 may include a plurality of audio processing modules to process audios corresponding to a plurality of pieces of content.

The audio output interface 525 may include various audio output circuitry and outputs audio included in a broadcasting signal received via the tuner 540, under the control by the processor 580. The audio output interface 525 may also output audio (for example, a voice or a sound) that is input via the communication interface 550 or the I/O interface 570. The audio output interface 525 may also output audio stored in the memory 590 under the control by the processor 580. The audio output interface 525 may include at least one of a speaker 526, a headphone output port 527, or a Sony/Philips Digital Interface (S/PDIF) output port 528. The audio output interface 525 may include a combination of the speaker 526, the headphone output port 527, and the S/PDIF output port 528.

The power supply 530 supplies power that is input from an external power source, to the internal components 510 through 590 of the display device 500, under the control by the processor 580. The power supply 530 may also supply power that is output by one or more batteries (not shown) located in the display device 500, to the internal components 510 through 590 of the display devices 500, under the control by the processor 580.

The tuner 540 may tune and select a frequency band corresponding to a channel that the display device 500 wants to receive, from among many radio wave components that are obtained by, for example, amplifying, mixing, or resonating a wired or wireless broadcasting signal. The broadcasting signal includes audio, video, and additional information (for example, an electronic program guide (EPG)).

The tuner 540 may receive a broadcasting signal in a frequency band corresponding to a channel number (e.g., cable broadcasting No. 506) according to a user input (for example, a control signal received from an external control device (not shown) (e.g., a remote controller), e.g., a channel number input, a channel up-down input, and a channel input on an EPG screen image).

The tuner 540 may receive a broadcasting signal from various sources, such as terrestrial broadcasting, cable broadcasting, satellite broadcasting, and Internet broadcasting. The tuner 540 may also receive a broadcasting signal from a source such as analog broadcasting or digital broadcasting. The broadcasting signal received via the tuner 540 is decoded (for example, audio decoding, video decoding, or additional information decoding) and is thus divided into audio, video, and/or additional information. The audio, the video, and/or the additional information may be stored in the memory 590 under the control by the processor 580.

The display device 500 may include a single tuner 540 or a plurality of tuners 540. According to an embodiment, when a plurality of tuners 540 are included, the plurality of tuners 540 may output a plurality of broadcasting signals to a plurality of windows included in a multi-window screen image provided to the display 515.

The tuner 540 may be all-in-one with the display device 500, or implemented as a separate device (for example, a tuner (not shown) that is connected to a set-top box (not shown) and the I/O interface 570) having a tuner that is electrically connected to the display device 500.

The communication interface 550 may include various communication circuitry and connect the display device 500 to an external device (for example, an audio device) under the control by the processor 580. The processor 580 may transmit/receive content to/from the external device connected via the communication interface 550, download an application from the external device, or perform web-browsing. For example, the communication interface 550 may be connected to a network to receive content from an external device (not shown).

As described above, the communication interface 550 may include at least one selected from a short-range wireless communication module (not shown), a wired communication module (not shown), and a mobile communication module (not shown).

FIG. 5 illustrates a case where the communication interface 550 includes one of the wireless LAN 551, a Bluetooth network 552, and a wired Ethernet network 553.

The communication interface 550 may include a module combination including one or more of the wireless LAN 551, the Bluetooth network 552, and the wired Ethernet network 553. The communication interface 550 may receive a control signal of a control device (not shown) under the control by the processor 580. The control signal may be implemented as a Bluetooth signal, a radio frequency (RF) signal, or a Wi-Fi signal.

The communication interface 550 may further include short-range communication (for example, near field communication (NFC) or Bluetooth low energy (BLE)), in addition to the Bluetooth network 552.

The sensor 560 may include various sensors and may sense a voice of a user, an image of the user, or an interaction with the user.

The sensor 560 may include a microphone 561. The microphone 561 receives an uttered voice of the user. The microphone 561 may transform the received voice into an electrical signal and output the electrical signal to the processor 580. The user voice may include, for example, a voice corresponding to a menu or function of the display device 500. For example, a recognition range of the microphone 561 may be recommended to be within 4 m from the microphone 561 to a location of the user, and may vary in correspondence to the magnitude of the voice of the user and a surrounding environment (for example, a speaker sound or ambient noise).

The microphone 561 may be integrated with or separate from the display device 500. The separated microphone 561 may be electrically connected to the display device 500 via the communication interface 550 or the I/O interface 570.

It will be easily understood by one of ordinary skill in the art that the microphone 561 may be excluded according to the performance and structure of the display device 500.

The sensor 560 may also include a camera 562. The camera 562 receives an image (for example, consecutive frames) corresponding to a motion of the user including a gesture within a recognition range of the camera 562. For example, the recognition range of the camera 562 may be a distance within 0.1 to 5 m from the camera 562 to the user. The motion of the user may include motion of a part of the body of the user, such as the face, a facial expression, the hand, the fist, and a finger of the user, or the like of the part of the body of the user. The camera 562 may convert a received image into an electrical signal under the control by the processor 580 and output the electrical signal to the processor 580.

The processor 580 may select a menu that is displayed on the display device 500 using a result of the recognition of the received motion, or perform control corresponding to a result of the motion recognition. For example, the control may be channel adjustment, volume adjustment, or indicator movement.

The camera 562 may include a lens (not shown) and an image sensor (not shown). The camera 562 may support optical zoom or digital zoom using a plurality of lenses and image processing. The recognition range of the camera 562 may be variously set according to the angle of the camera 562 and surrounding environment conditions. When the camera 562 is comprised of a plurality of cameras, a three-dimensional (3D) still image or a 3D motion may be received by the plurality of cameras.

The camera 562 may be integrated with or separate from the display device 500. A separate device (not shown) including the separate camera 562 may be electrically connected to the display device 500 via the communication interface 550 or the I/O interface 570.

It will be easily understood by one of ordinary skill in the art that the camera 562 may be excluded according to the performance and structure of the display device 500.

The sensor 560 may also include a light receiver 563. The light receiver 563 receives an optical signal (including a control signal) from the external control device (not shown) via a light window (not shown) of the bezel of the display 515. The light receiver 563 may receive an optical signal corresponding to a user input (for example, touch, pressing, a touch gesture, a voice, or a motion) from the control device (not shown). A control signal may be extracted from the received optical signal under the control by the processor 580.

For example, the light receiver 563 may receive a signal corresponding to a pointing location of the control device (not shown) and transmit the received signal to the processor 580. For example, when a user interface screen image for receiving data or a command from a user has been output via the display 515 and the user wants to input data or a command to the display device 500 via the control device, the user moves the control device (not shown) while touching a touch pad (not shown) provided in the control device, and, at this time, the light receiver 563 may receive a signal corresponding to a motion of the control device and transmit the received signal to the processor 580. The light receiver 563 may receive a signal indicating that a certain button provided on the control device has been pressed, and transmit the received signal to the processor 580. For example, when the user presses a button-type touch pad (not shown) provided in the control device with his or her finger, the light receiver 563 may receive a signal indicating that the button-type touch pad has been pressed, and transmit the received signal to the processor 580. For example, the signal indicating that the button-type touch pad has been pressed may be used as a signal for selecting one from among items.

The I/O interface 570 may include various input/output circuitry and receives video (for example, a moving picture), audio (for example, a voice or music), and additional information (for example, an EPG) from outside the display device 500 under the control by the processor 580. The I/O interface 570 may include a High-Definition Multimedia Interface (HDMI) port 571, a component jack 572, a PC port 573, or a USB port 574. The I/O interface 570 may include a combination of the HDMI port 571, the component jack 572, the PC port 573, and the USB port 574.

It will be understood by one of ordinary skill in the art that the structure and operation of the I/O interface 570 may be variously implemented according to embodiments of the disclosure.

The processor 580 may include various processing circuitry and controls an overall operation of the display device 500 and signal transfer among the internal components of the display device 500 and processes data. When there is an input of a user or stored preset conditions are satisfied, the processor 580 may execute an operation system (OS) and various applications that are stored in the memory 590.

The processor 580 may include RAM (not shown) that stores a signal or data input by an external source of the display device 500 or is used as a memory area for various operations performed by the display device 500, ROM (not shown) that stores a control program for controlling the display device 500, and a processor (not shown).

The processor may include a graphics processing unit (GPU) (not shown) for performing video graphics processing. The processor may be implemented as a system-on-chip (SoC) into which a core (not shown) and a GPU (not shown) are integrated. The processor may include a single core, a dual core, a triple core, a quad core, or a multiple core thereof.

The processor may include a plurality of processors. For example, the processor may be implemented using a main processor and a sub-processor operating in a sleep mode.

The GPU generates a screen image including various objects, such as an icon, an image, and a text, using an arithmetic unit (not shown) and a rendering unit (not shown). The arithmetic unit calculates attribute values, such as a coordinate value, a shape, a size, a color, and the like, with which each object is to be displayed according to layouts of the screen image, using the user interaction sensed by the sensor (not shown). The rendering unit generates screen images of various layouts including objects, based on the attribute values calculated by the arithmetic unit. The screen images generated by the rendering unit are displayed on a display area of the display 515.

Operations for Wi-Fi communication that are performed by the electronic device 300 or 400 and the display device 500 according to an embodiment of the disclosure will now be described in greater detail below with reference to FIGS. 6 through 20.

Figure 6:
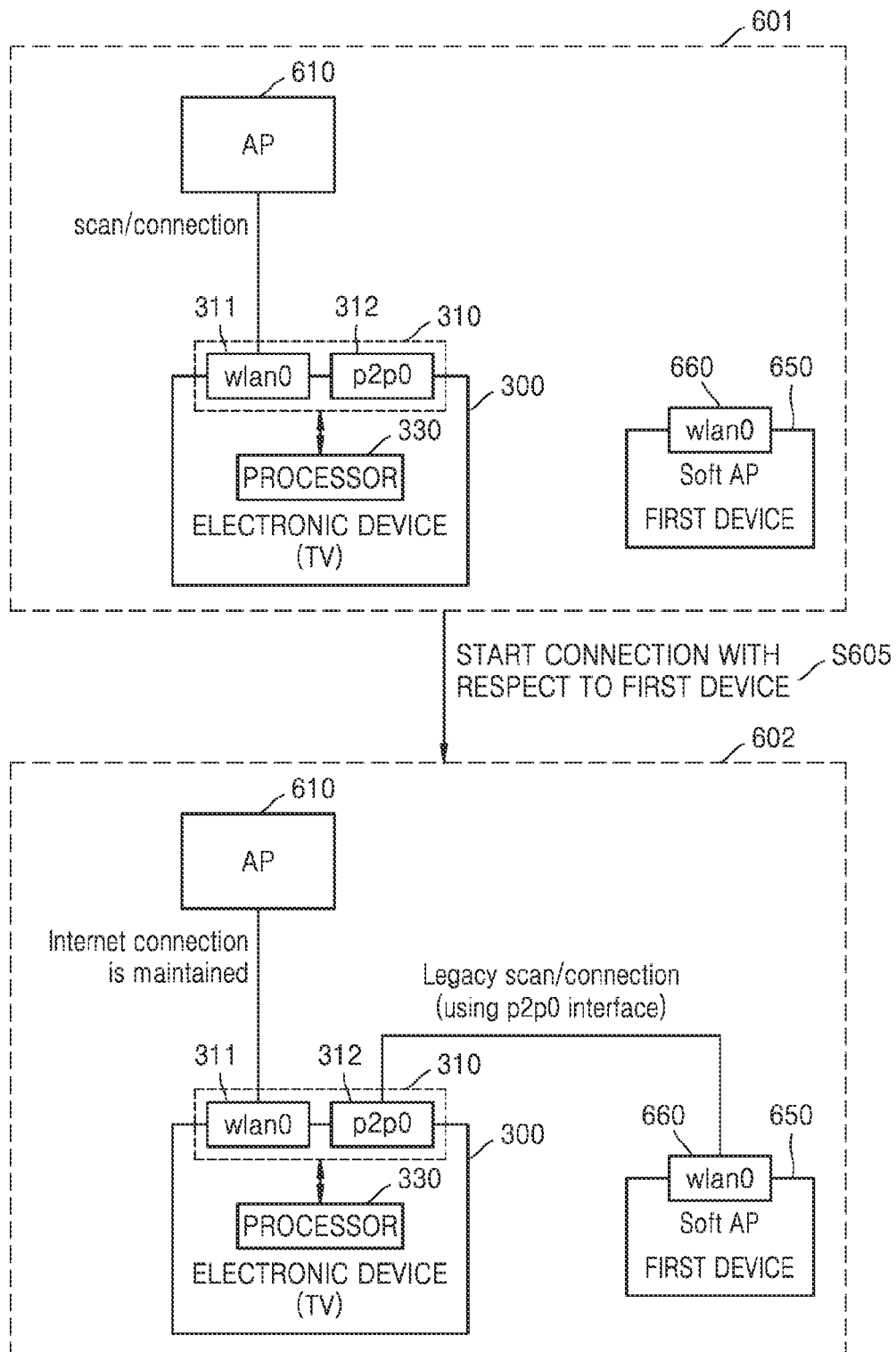
FIG. 6 is a diagram illustrating an example communication connection operation performed by an electronic device according to various embodiments.

FIG. 6 is a diagram illustrating an example communication connection operation performed by an electronic device according to various embodiments. FIG. 6 illustrates, for convenience of explanation, a case where an electronic device according to an embodiment of the disclosure is the electronic device 300 of FIG. 3. Accordingly, components of FIG. 6 that are the same as or similar to those of FIG. 3 are illustrated using the same reference numerals, and descriptions of FIG. 6 that are the same as or similar to those given above with reference to FIG. 3 may not be repeated here.

Referring to FIG. 6, a Wi-Fi module 310 includes a first communication interface 311 operating as a Wi-Fi station and performing communication, and a second communication interface 312 performing communication based on Wi-Fi Direct.

The processor 330 controls the Wi-Fi module 310 to set an operation mode of the second communication interface 312 to be a first mode for performing communication by operating as the Wi-Fi station, and perform communication connection with a second AP 660 via the second communication interface 312 in the first mode, while connection with a first AP 610 is being maintained through the first communication interface 311. In FIG. 6, the first communication interface 311 may refer to a communication interface of which a basic operation mode performs communication by operating as a Wi-Fi station. Accordingly, in FIG. 6, the first communication interface 311 is indicated by 'wLan0 (Wireless Lan 0)'. The second communication interface 312 may refer to a communication interface of which a basic operation mode performs P2P communication that is direct communication between devices. Accordingly, in FIG. 6, the second communication interface 312 is indicated by 'p2p0 (Peer to Peer 0)'.

According to an embodiment of the disclosure, the first AP 610 and the second AP 660 may indicate different APs. The second AP 660 may be included in a first device 650. For example, the second AP 660 may be an activated Soft AP. The second AP 660 may be included in the first device 650.

According to the embodiment of FIG. 6, the electronic device 300, the first AP 610, and the first device 650 may correspond to the mediator 160, the enroller 103, and the enrollee 200 of FIG. 2, respectively. For example, the electronic device 300 may be an electronic device operating as a mediator that supports the first device 650, which is an IoT device that needs to be registered in a server to implement an IoT platform, to connect to the first AP 610. For example, the first device 650 that needs to be registered in a server to implement an IoT platform may activate a Soft AP using a Wi-Fi module (not shown) included in the first device 650, and enable registration of the IoT device using the activated Soft AP.

For example, the first AP 610 and the second AP 660 may be formed to be included in a single device or may be formed to be included in two different electronic devices, respectively. For example, the first AP 610 may be included in a home AP, and the second AP 660 may be included in an IoT device corresponding to an enrollee. The embodiment of FIGS. 6 through 18, which will be described below, illustrates a case where the first AP 610 and the second AP 660 are included in different electronic devices, respectively.

The first AP 610 and the second AP 660 may be included in a single electronic device. For example, the first AP 610 and the second AP 660 may be included in an AP device that is driven according to a multi-band method to perform communication in each of a plurality of different frequency bands. An embodiment of FIGS. 19 and 20, which will be described below, illustrates a case where the first AP 610 and the second AP 660 are included in a single electronic device.

Referring to block 601, the electronic device 300 according to an embodiment of the disclosure may first complete and maintain communication connection with the first AP 610. For example, the electronic device 300 is connected to the first AP 610 via the first communication interface 311. For example, the first communication interface 311 may perform a scan operation for connection with the first AP 610, and may complete and maintain communication connection with the first AP 610 found as a result of the scan operation. The operation mode of the first communication interface 311 operating as a Wi-Fi station may be basically the first mode. Scanning an AP for connection with the AP may be referred to as a legacy scan.

Communication connection with respect to the first device 650 may be initiated to register the first device 650 in a server (S605). Referring to block 602, for communication connection with respect to the first device 650, the electronic device 300 according to an embodiment of the disclosure may set the operation mode of the second communication interface 312 to be the first mode and may perform communication connection between the second interface 312 in the first mode, which is for performing communication by operating as a Wi-Fi station, and the second AP 660.

The basic operation mode of the second communication interface 312 may be the second mode. According to an embodiment of the disclosure, when the first device 650 needs to be registered in an IoT server in order to include the first device 650 in the IoT platform, without disconnecting the first communication interface 311 from the first AP 610, the operation mode of the second communication interface 312 may be set (or changed) to the first mode so that the second AP 660 included in the first device 650 is connected to the second communication interface 312.

In the related art, in order for an electronic device including one Wi-Fi module to operate as a mediator to communicate with an electronic device operating as an enrollee, the electronic device should be disconnected from an AP operating as an enrollee. In other words, a Wi-Fi communication connection between an electronic device operating as a mediator and an electronic device operating as an enroller may not be completed without disconnecting an AP operating as an enroller from the electronic device operating as the mediator. To include an IoT device in the IoT platform, when the AP operating as an enroller is disconnected from the electronic device operating as the mediator, the electronic device operating as a mediator does not perform communication with the AP operating as an enroller. Accordingly, the electronic device operating as a mediator may not perform a data transmission or reception and/or control operation based on the IoT platform while not performing communication with the AP operating as an enroller. Therefore, operation stability and control reliability of the IoT platform degrade.

According to an embodiment of the disclosure, to address the above-described problems of the related art, while a Wi-Fi communication connection between the first communication interface 311 and the first AP 610, which is the AP operating as an enroller, is being maintained by changing and using the operation mode of the second communication interface 312, communication connection between the second communication interface 312 and the first device 650, which is the electronic device operating as an enrollee, may be completed.

Thus, the electronic device 300 operating as a mediator may be prevented from not receiving data from the first AP 610, which the AP operating as an enroller, or not transmitting data to the first AP 610 due to disconnection between the AP operating as an enroller and the electronic device operating as a mediator.

Figure 7:
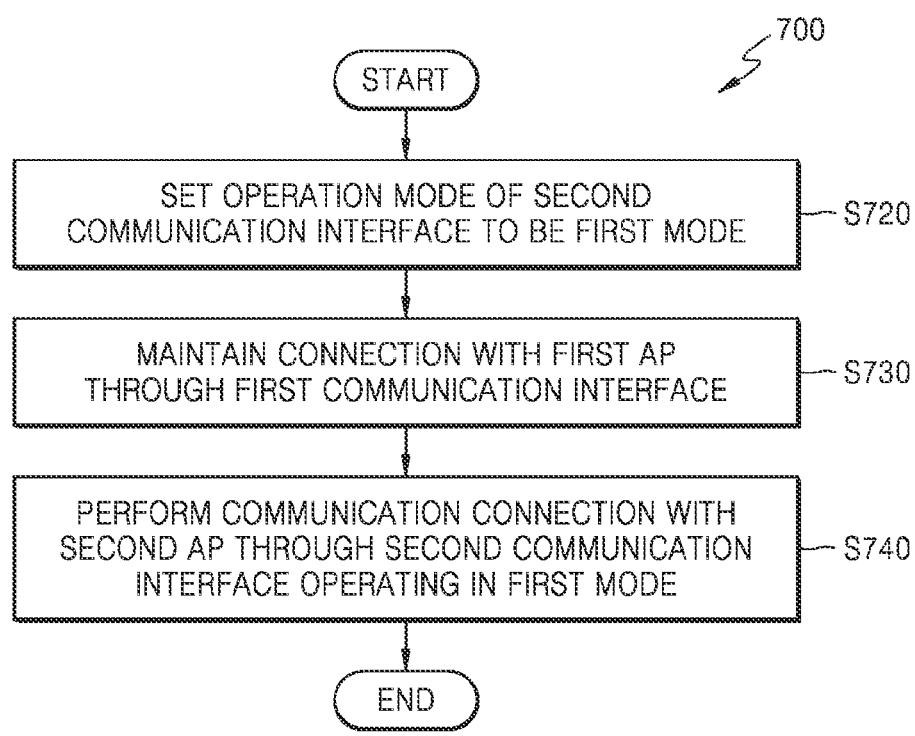
FIG. 7 is a flowchart illustrating an example method of operating an electronic device, according to various embodiments.

FIG. 7 is a flowchart illustrating an example method 700 of operating an electronic device, according to various embodiments. The method 700 of operating the electronic device according to an embodiment of the disclosure may be a method of operating the electronic device 160, 300, 400 or 500 according to an embodiment of the disclosure described above with reference to FIGS. 1 through 6. In other words, FIG. 7 may be a flowchart illustrating a flow of operations performed by the electronic device 160, 300, 400 or 500 according to an embodiment of the disclosure. Thus, a repeated description of the operations performed by the electronic device 160, 300, 400 or 500 given above with reference to FIGS. 1 through 6 may not be repeated in the description of the operations included in the operation method 700 of the electronic device.

A case where the operation method 700 of the electronic device is performed by the electronic device 300 of FIGS. 3 and 6 will now be described. The operation method 700 of the electronic device will be described with reference to the first AP 610, the second AP 660, and the first device 650 of FIG. 6.

The method 700 of operating the electronic device may be a method of operating the electronic device 300 performing communication by including the first communication interface 311 operating as a Wi-Fi station and performing communication and the second communication interface 312 performing communication based on Wi-Fi Direct.

Referring to FIG. 7, the method 700 of operating the electronic device sets the operation mode of the second communication interface 312 to be the first mode for performing communication by operating as a Wi-Fi station (S720). Operation S720 may be performed by the processor 330 by controlling the Wi-Fi module 310. For example, the processor 330 may change or set the operation mode of the second communication interface 312 to be the first mode.

In the method 700 of operating the electronic device, connection with the first AP 610 through the first communication interface 311 is maintained (S730). Operation S730 may be performed by the first communication interface 311 of the Wi-Fi module 310. For example, the processor 330 may control the first communication interface 311 not to release Wi-Fi communication connection with the first AP 610.

In the method 700 of operating the electronic device, while connection with the first AP 610 is being maintained through the first communication interface 311, communication connection with the second AP 660 is performed through the second communication interface 312 in the first mode (S740). Operation S740 may be performed by the processor 330 by controlling the Wi-Fi module 310. For example, the processor 330 may control the second communication interface 312 to perform communication connection with the second AP 660 through the second communication interface 312.

Figure 8A:
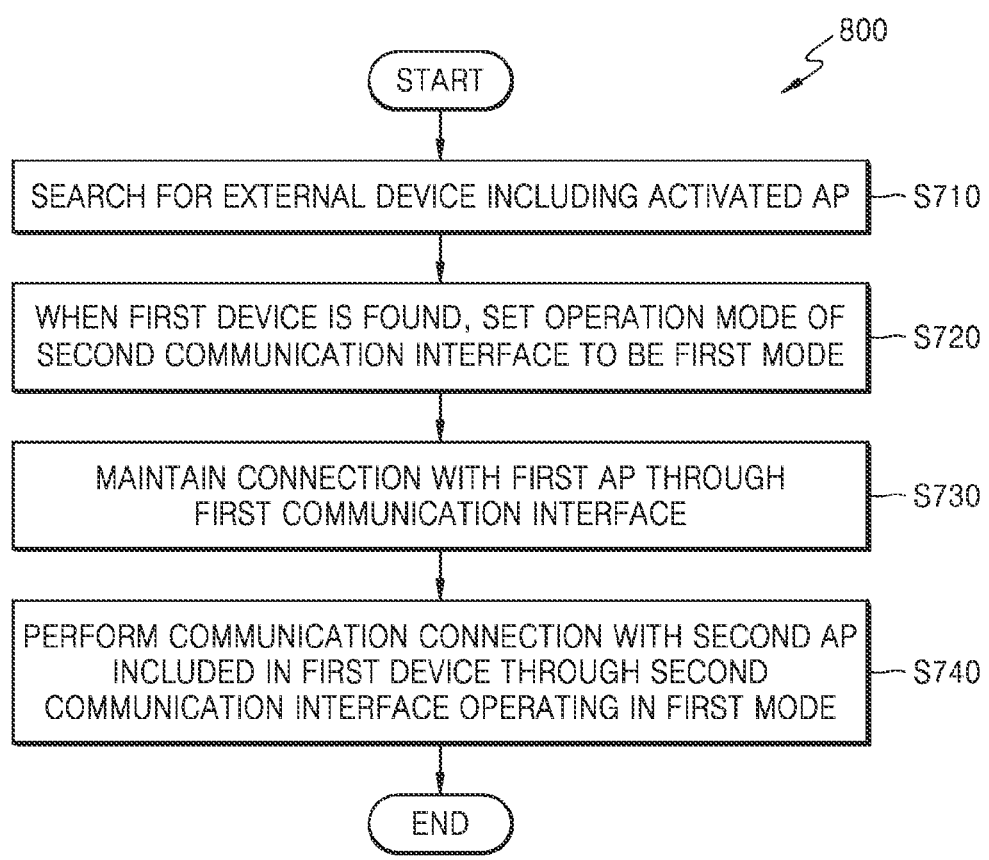
FIG. 8A is a flowchart illustrating an example method of operating an electronic device, according to various embodiments.

FIG. 8A is a flowchart illustrating an example method 800 of operating an electronic device, according to various embodiments. The method 800 of operating the electronic device according to an embodiment of the disclosure may further include operation S710, compared with the operation method 700 of the electronic device of FIG. 7. Components of the operation method 800 of the electronic device that are the same as or similar to the components of the method 700 of operating the electronic device are indicated by the same reference numerals or characters, and thus may not be repeated here.

A case where the method 800 of operating the electronic device is performed by the electronic device 400 of FIG. 4 will now be described as an example. The method 800 of operating the electronic device will be described with reference to the first AP 610, the second AP 660, and the first device 650 of FIG. 6.

Referring to FIG. 8A, the method 800 of operating the electronic device may further include operation S710 of searching for an external device including an activated AP. For example, in operation S710, an external device including the activated AP, for example, the first device 650, may be searched for. An operation of searching for an activated AP (for example, an activated Soft AP) may be referred to as a scan operation. The scan operation may refer to an operation of searching for an external device including an activated AP. The activated AP may be an activated Soft AP. Operation S710 may be performed by the processor 330 by controlling the Wi-Fi module 310. For example, the processor 330 may control the second communication interface 311 to perform an external device searching operation.

For example, the first communication interface 311 may perform a scan operation of searching for an external device including an activated AP (for example, a first device). The scan operation may be initiated under the control by the processor 330. For example, based on a user input of requesting an external device search, the processor 330 may control the first communication interface 311 to perform a scan operation. As another example, the processor 330 may control the first communication interface 311 to perform a scan operation at regular intervals.

For example, an electronic device according to an embodiment of the disclosure (for example, 400) may search for an external device including an activated AP at preset time intervals. An electronic device according to an embodiment of the disclosure (for example, 400) may search for an external device including an activated AP at preset time intervals, based on a user input of requesting an external device to be searched for. The searching operation may be performed by the processor 330 by controlling the Wi-Fi module 310. For example, the processor 330 may perform a scan operation for detecting an activated AP, through the first communication interface 311.

Referring back to FIG. 2, when there is a need to register another electronic device in the server 101 for providing an IoT platform using an electronic device, the operation method 800 of the electronic device according to an embodiment of the disclosure may perform an operation of searching for a first device including a second AP.

For example, when a user of an electronic device according to an embodiment of the disclosure (for example, 400) or a first device (for example, 650 of FIG. 6), which is an electronic device that needs to be registered wants the first device 650 to be newly purchased or be included in the IoT platform, the user may input a user input of requesting an external device including an activated AP to be searched for, through the user interface 360 of the electronic device (for example, 400).

Operation S710 may be performed based on the user input received through the user interface 360 of the electronic device (for example, 400). Execution of operation S710 based on the user input will be described in greater detail below with reference to FIG. 8B.

Operation S710 may be automatically performed by the electronic device (for example, 400). For example, operation S710 may be performed by the processor 330 by controlling the Wi-Fi module 310. For example, the processor 330 may perform a scan operation for detecting an activated AP, through the first communication interface 311. For example, when the user inputs a user input for powering on the electronic device (for example, 400), the electronic device (for example, 400) may be powered on in response to the user input and then automatically perform operation S710.

The electronic device (for example, 400) may automatically perform operation S710 at intervals of a certain time. The certain time may be set as, for example, one minute, 10 minutes, one hour, one day, or one week. For example, a certain event such as a power on request or an IoT server connection request is occurred in the electronic device (for example, 400), operation S710 may be performed in response to the event or the request. The certain time may be set by the electronic device (for example, 400) or may be set by a server providing an IoT platform (for example, an IoT server) or the user of the electronic device (for example, 400).

Based on the first device 650 including an activated AP being found as a result of the searching in operation S710, the operation method 800 of the electronic device 800 may change the operation mode of the second communication interface 312 from the second mode for performing communication based on Wi-Fi Direct to the first mode (S720). In other words, based on finding of the first device 650 including an activated AP as a result of the scanning (or searching) in operation S710, the operation mode of the second communication interface 312 may be changed to the first mode.

For example, the second communication interface 312 may be an interface that communicates based on Wi-Fi Direct for integrated communication. Accordingly, it is general that the basic operation mode (or an initial operation mode) of the second communication interface 312 is set as the second mode. According to an embodiment of the disclosure, based on the first device, which is the electronic device including the activated AP (e.g., the activated Soft AP) being found, the processor 330 may control the operation mode of the second communication interface 312 to become the second mode.

In other words, the processor 330 may search for the external device including the activated AP, based on a user input received through the user interface 360 (S710), and, based on the first device being found as a result of the searching, may change the operation mode of the second communication interface 312 from the second mode to the first mode (S720). The processor 330 may search for the external device including the activated AP at preset time intervals (S710), and, based on the first device being found as a result of the searching, may change the operation mode of the second communication interface 312 from the second mode to the first mode (S720).

For example, operation S720 of changing the operation mode of the second communication interface 312 from the second mode to the first mode may be performed based on the user input.

For example, in the method 800 of operating the electronic device, the operation mode of the second communication interface 312 may be set to the first mode for performing communication by operating as a Wi-Fi station, based on the user input (S720). For example, in operation S720, the processor 330 may receive the user input received through the user interface 360. When the received user input is a user input of requesting connection with the second AP or communication connection with the first device, the processor 330 may set the operation mode of the second communication interface 312 as the first mode for performing communication by operating as a Wi-Fi station (S720). For example, in response to the user input, the processor 330 may change or set the operation mode of the second communication interface 312 to be the first mode.

Execution of operation S720 in response to the user input will be described in greater detail below with reference to FIGS. 8B through 8G.

Figure 8B:
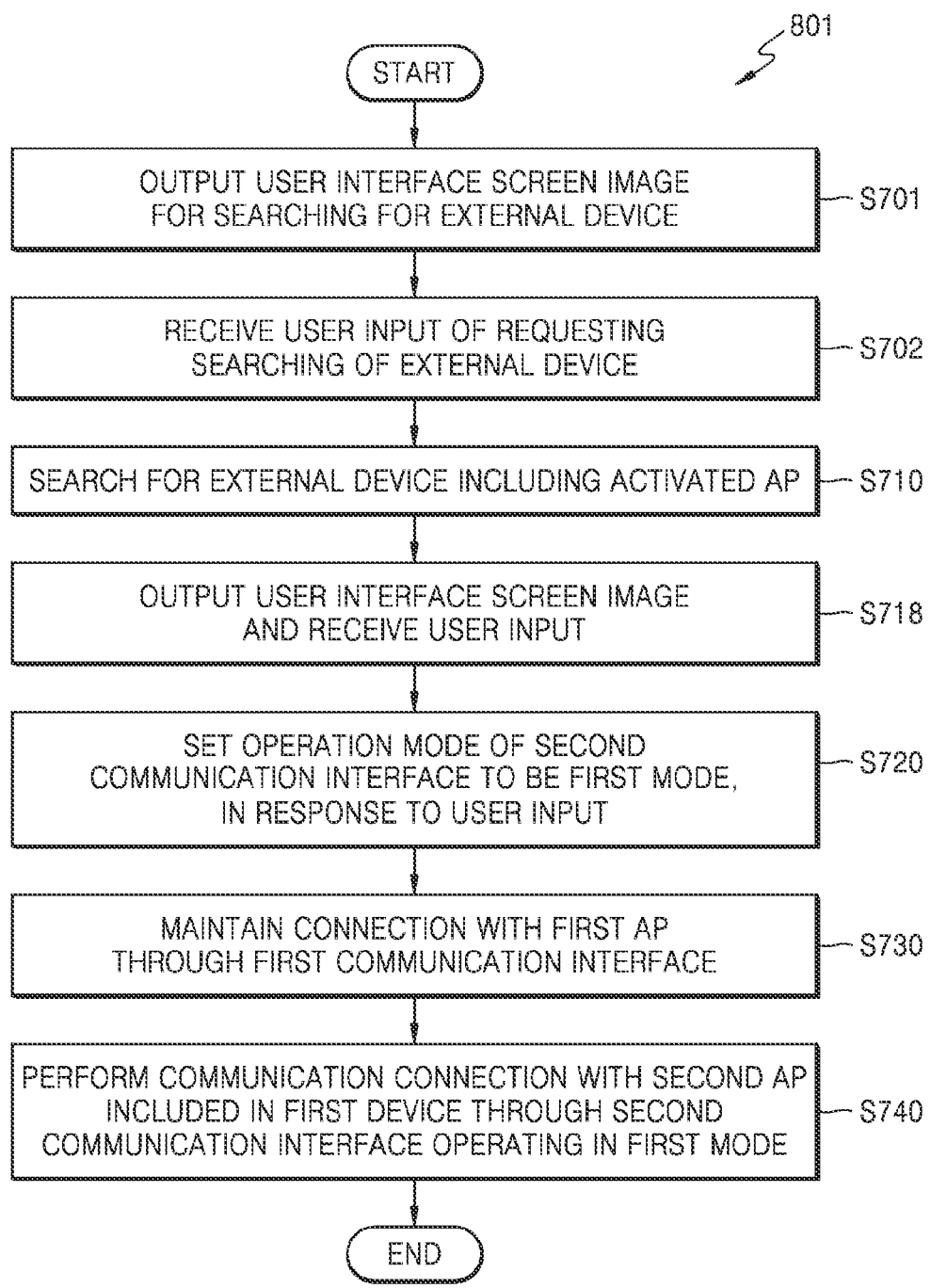
FIG. 8B is a flowchart illustrating an example method of operating an electronic device, according to various embodiments.

FIG. 8B is a flowchart illustrating an example method 801 of operating an electronic device, according to various embodiments. The method 801 of operating the electronic device according to an embodiment of the disclosure may further include at least one of operations S701, S702, and/or S718, compared with the method 800 of operating the electronic device of FIG. 8A. Components of the method 801 of operating the electronic device that are the same as or similar to the components of the method 800 of operating the electronic device are indicated by the same reference numerals or characters, and thus may not be repeated herein.

A case where the method 801 of operating the electronic device is performed by the electronic device 400 of FIG. 4 will now be described as an example. The method 801 of operating the electronic device will be described with reference to the first AP 610, the second AP 660, and the first device 650 of FIG. 6.

According to an embodiment of the disclosure, the processor 330 may perform a scan operation of searching for an external device including an activated AP, based on a user input of requesting searching of the external device, the user input being received through the user interface 360, and, based on the first device including the second AP being found as a result of the scan operation, the processor 330 may change the operation mode of the second communication interface 312 from the second mode to the first mode.

For example, the processor 330 may control execution of a scan operation of searching for the external device including an activated AP, based on a user input of requesting searching of the external device through the user interface 360, and, when the first device including the second AP is found as a result of the scan operation, the processor 330 may control outputting of a user interface screen image for connection with respect to the second AP. In response to a user input corresponding to the user interface screen image, the processor 330 may obtain information necessary for connection with respect to the second AP. The information necessary for connection with respect to the second AP may be obtained based on a signal received during the scanning in operation S710. Because the obtainment of the information necessary for connection with respect to the second AP corresponds to operation S712, which will be described later, a detailed description thereof will be given later.

Referring to FIG. 8B, in the method 801 of operating the electronic device, a user interface screen image for searching for an external device may be output (S701). For example, the user interface screen image output in operation S701 may be a user interface screen image including menus for starting searching for an external device including an activated AP.

The outputting of the user interface screen image in operation S701 may be performed in response to occurrence of a certain event. For example, the certain event may occur in response to, for example, a power on request of the electronic device 400, an IoT server connection request thereof, a specific command received to the electronic device 400, or a certain control signal received by the electronic device 400. For example, a remote controller (not shown) for controlling the electronic device 400 may include an 'external device connection' key. In this case, when a user presses the 'external device connection' key of the remote controller (not shown), the remote controller (not shown) may transmit a control signal corresponding to 'the external device connection' key to the electronic device 400. Then, the processor 330 of the electronic device 400 may control the display 350 to display the user interface screen image, based on the received control signal.

The user interface screen image output in operation S701 will be described in greater detail below with reference to FIG. 8C.

In the method 801 of operating the electronic device, a user input of requesting searching of an external device may be received through the user interface screen image output in operation S701 (S702). Operation S702 may be performed through the user interface 360. For example, in operation S702, the user interface 360 may receive the user input and transmit the received user input to the processor 330. Then, the processor 330 may control the Wi-Fi module 310 so that operation S710 is performed, in response to reception of the user input.

Operations S701 and S702 will now be described in greater detail below with reference to FIGS. 8C through 8F.

Figure 8C:
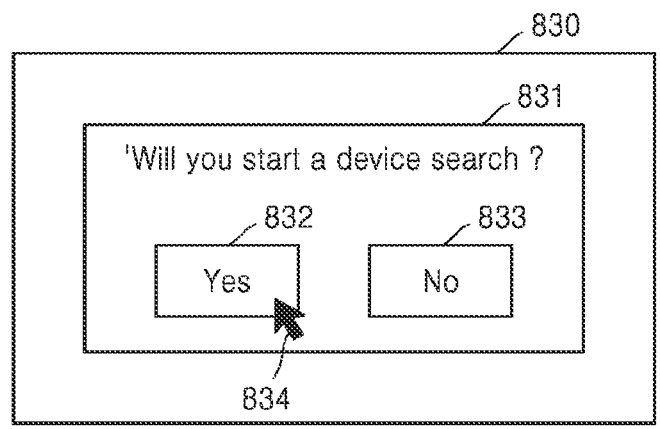
FIG. 8C is a diagram illustrating an example of a user interface screen image output by an electronic device according to various embodiments.

FIG. 8C is a diagram illustrating an example of a user interface screen image output by an electronic device according to various embodiments. A case where a user interface screen image 830 is output by the electronic device 400 of FIG. 4 will now be described as an example.

Referring to FIG. 8C, the user interface screen image 830 output in operation S701 may include a text message and key menus for starting searching for the external device.

For example, the user interface screen image 830 may include a text message window 831 for receiving an input of a user and menus 832 and 833 capable of receiving a user input, in order to search for the external device. For example, the text message window 831 may include a text message of 'Will you start a device search?'. As another example, the text message window 831 may include a text message of 'We will start a device search'. A voice message corresponding to 'Will you start a device search?' may be output instead of the text message window 831.

For example, the user interface screen image 830 may be output in response to a request of the user. For example, the user may input a command of requesting that a device search start through the user interface 360) or the remote controller (not shown) for controlling the electronic device (for example, 400). Then, the processor 330 may control the display 350 to output the user interface screen image 830 in response to the received command of the user (or the received user input).

As another example, the user interface screen image 830 may be output in response to a certain event (for example, a power on request by the electronic device 400, an IoT server connection request, or a specific command received by the electronic device 400).

The user may input a user input for requesting a device search, through the user interface screen image 830. For example, the user may input a user input of requesting execution of a scan operation for searching for an external device to the electronic device 400, by selecting a 'Yes' key 832 included in the user interface screen image 830. The selection may be achieved using a selection tool such as a cursor 834. The selection may be achieved through voice recognition or gesture recognition. For example, when the user utters a voice of 'yes' within a certain time period after the user interface screen image 830 is output, the user interface 360 of the electronic device 400 may recognize the uttered voice and may determine that the user has selected the 'Yes' key 832. As another example, when the user takes a gesture of a letter 'O' using two arms in front of the electronic device 400 within a certain time period after the user interface screen image 830 is output, the electronic device 400 may recognize the gesture of the user using at least one sensor (for example, an image sensor and a motion sensor) and may determine that the user has selected the 'Yes' key 832.

The user may select a 'No' key 833 included in the user interface screen image 830. In this case, the operation method 801 of the electronic device may be concluded without execution of subsequent operations.

In the method 801 of operating the electronic device, a user input of requesting an external device to be searched for may be received through the user interface screen image 830 output in operation S701 (S702).

For example, the processor 330 may control the Wi-Fi module 310 so that searching of the external device starts, based on the user input received in operation S702 in correspondence with the user interface screen image 830. Accordingly, the Wi-Fi module 310 may perform a scan operation. For example, the first communication interface 311 of the Wi-Fi module 310 may perform a scan operation under the control by the processor 330.

Referring back to FIG. 8B, in the method 801 of operating the electronic device, operation S710 may be performed based on the user input received in operation S702.

In the method 801 of operating the electronic device 801, based on the external device being found as a result of the searching in operation S710, a user interface screen image corresponding to the result of the searching may be output (S718). For example, the processor 330 may generate a user interface screen image including information about the found external device, and may control the display 350 to display the generated user interface screen image.

The user interface screen image output in operation S718 will now be described in greater detail with reference to FIG. 8D.

Figure 8D:
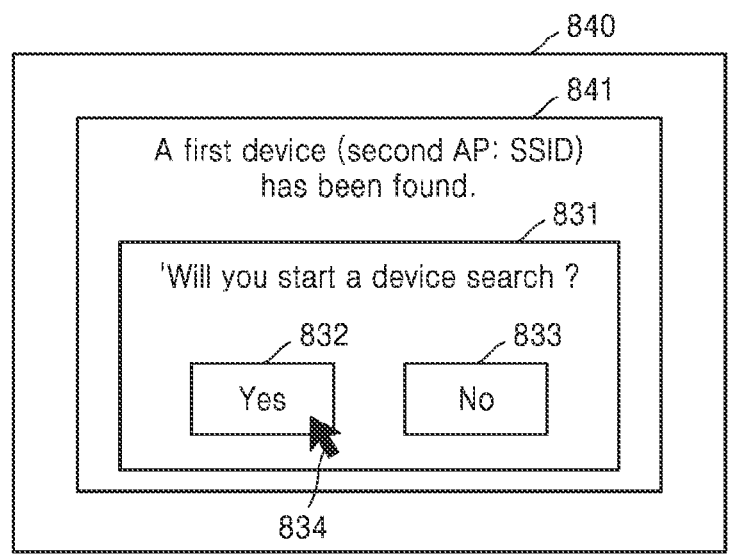
FIG. 8D is a diagram illustrating example of a user interface screen image output by an electronic device according to various embodiments.

FIG. 8D is a diagram illustrating another example of a user interface screen image output by an electronic device according to various embodiments. A case where a user interface screen image 840 is output by the electronic device 400 of FIG. 4 will now be described as an example. Components of FIG. 8D that are the same as or similar to those of FIG. 8C are illustrated using the same reference numerals, and descriptions of FIG. 8D that are the same as or similar to those given above with reference to FIG. 8C may not be repeated here.

Referring to FIG. 8D, the user interface screen image 840 output in operation S718 may include a text message window 841 indicating a result of searching for the external device.

For example, the text message window 831 is displayed on the user interface screen image 840. After the text message window 831 being displayed on the user interface screen image 840, the processor 330 may control the Wi-Fi module 310 so that searching of the external device starts, based on the user input received correspondence with the text message window 831. Accordingly, the Wi-Fi module 310 may perform a scan operation. After the scan operation being completed, the text message window 841 may be displayed on the user interface screen image 840.

For example, the user interface screen image 840 may include a text message window 841 informing a found external device. For example, when the external device found from the electronic device 400 exists, the text message window 841 may include information about the found external device.

For example, the text message window 841 may include a text message 'A first device (second AP: SSID) has been found.'. For example, the text message window 841 may include information about an activated AP included in a found device. For example, the text message window 841 may include information identifying the activated AP, like second AP: SSID2'. For example, the information identifying the activated AP may include a Service Set ID (SSID), a MAC address, and/or an IP address allocated by a corresponding AP. Accordingly, a user may watch the text message window 841 and recognize or specify an AP of a found device.

The user interface screen image 840 may include a text message window 831 for receiving a user input of requesting communication connection with the found external device.

When a user input of requesting communication connection with the found external device is received, for example, when a user input corresponding to a 'Yes' key 832 is received, through the text message window 842, the electronic device 400 may perform operation S720 as a previous operation for communication connection with an external device.

For example, in the method 801 of operating the electronic device, the operation mode of the second communication interface 312 may be changed from the second mode for performing communication based on Wi-Fi Direct to the first mode, based on the user input received in correspondence with the user interface screen image 840 in operation S718 (S720). In other words, in response to the first device 650 including the activated AP being found as a result of the scanning (or searching) in operation S710 and then a user input of requesting communication connection with the second AP, which is the activated AP included in the first device 650 is received, the processor 330 may control the Wi-Fi module 310 so that the operation mode of the second communication interface 312 is changed to the first mode.

Accordingly, operations S720, S730, and S740 may be performed, and thus the electronic device 400 may complete communication connection with the found external device. Operations S720, S730, and S740 included in the operation method 801 of the electronic device have been described above in detail with reference to FIGS. 7 through 8D, and thus detailed descriptions thereof may not be repeated here.

A plurality of external devices may be found as a result of the scanning in operation S710. In this case, the electronic device 400 may output a user interface including a list of the found external devices. A user interface screen image including the list will now be described in greater detail below with reference to FIGS. 8E and 8F.

The user may select a 'No' key 833 included in the user interface screen image 840. In this case, the operation method 801 of the electronic device may be concluded without execution of subsequent operations.

Figure 8E:
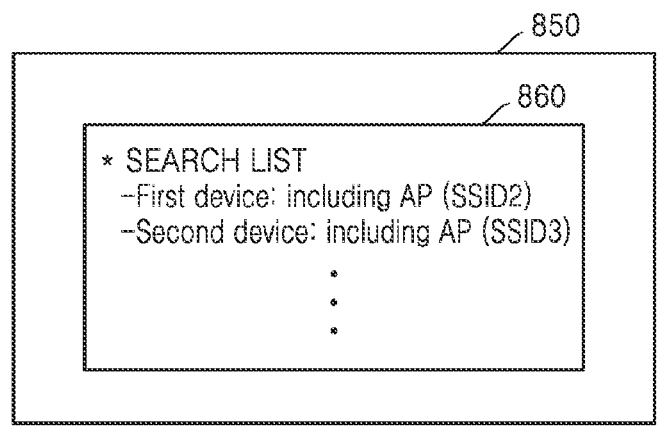
FIG. 8E is a diagram illustrating example of a user interface screen image output by an electronic device according to various embodiments.

FIG. 8E is a diagram illustrating another example of a user interface screen image output by an electronic device according to various embodiments.

Figure 8F:
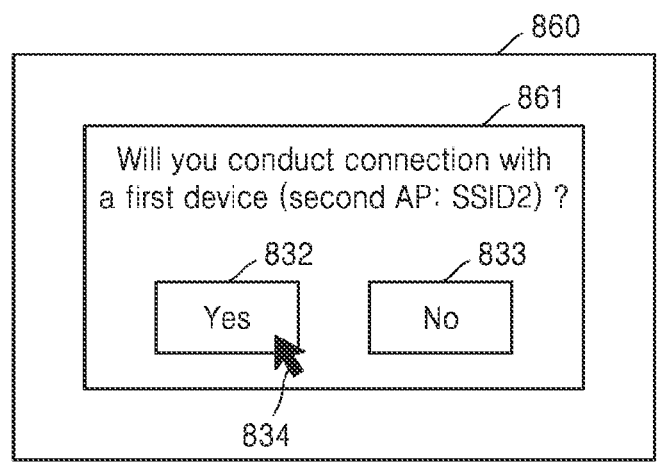
FIG. 8F is a diagram illustrating an example of a user interface screen image output by an electronic device according to various embodiments.

FIG. 8F is a diagram illustrating another example of a user interface screen image output by an electronic device according to various embodiments.

Referring to FIG. 8E, a user interface screen image 850 output in operation S718 may include a text message window 860 indicating a list of found external devices.

Each of the items of the list included in the text message window 860 may include information (for example, 'First device: including second AP (SSID)) about an activated AP included in a found device.

A user may select a device desiring to be connected from the list included in the text message window 860. For example, the user may select the first device including the second AP. For example, the user may input, to the electronic device 400 through the user interface screen image 850, a user input of selecting the first device including the second AP.

The electronic device 400 may output a user interface screen image 860 of FIG. 8F in response to reception of the user input.

Referring to FIG. 8F, the user interface screen image 860 may include a text message window 861 for receiving a request for connection with an external device selected from the list. The text message window 861 corresponds to the text message window 841 of FIG. 8D, and thus a detailed description thereof may not be repeated here.

In the method 801 of operating the electronic device, the operation mode of the second communication interface 312 may be changed from the second mode for performing communication based on Wi-Fi Direct to the first mode, based on the user input received in correspondence with the user interface screen image 860 in operation S718 (S720).

Figure 8G:
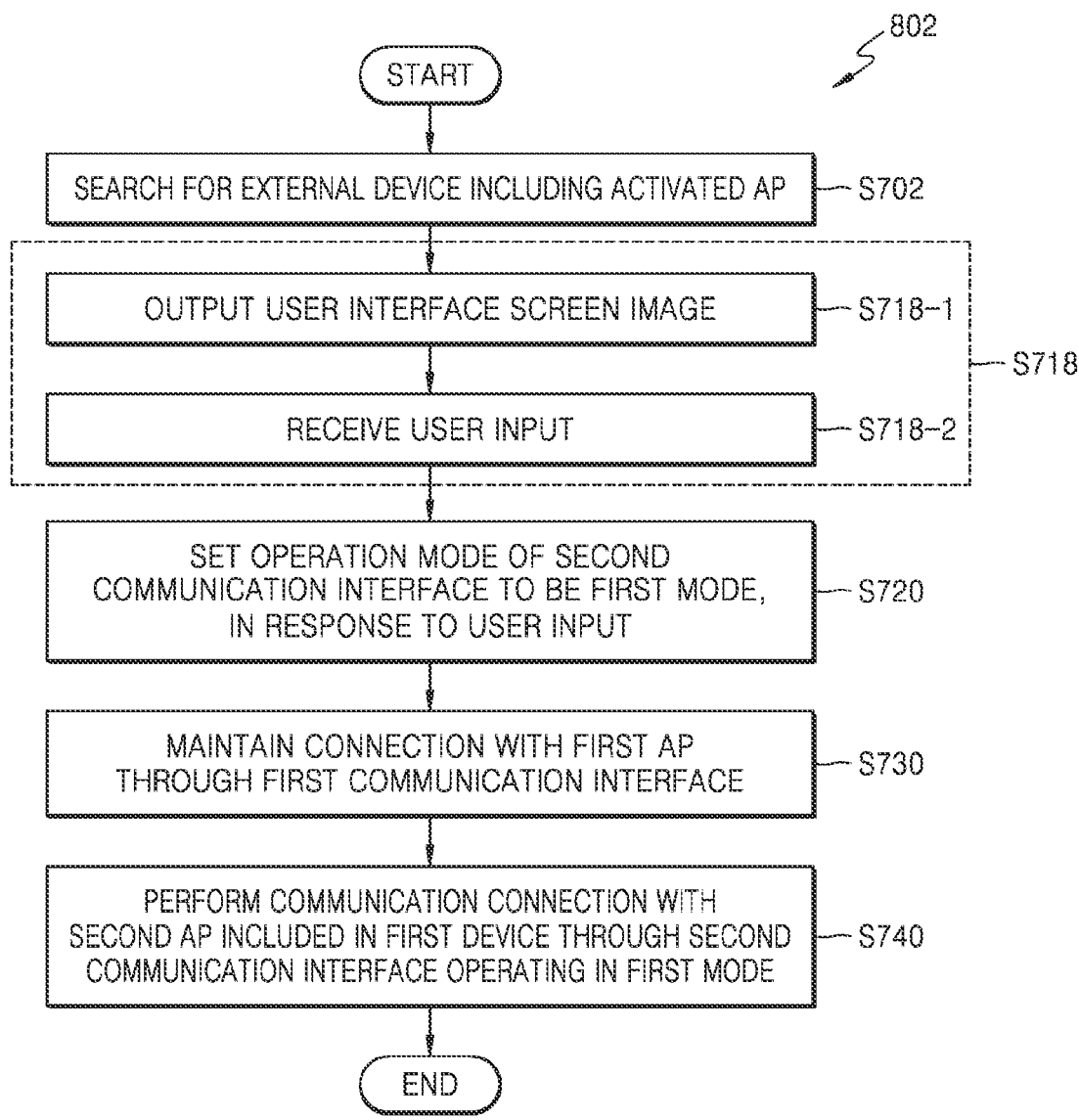
FIG. 8G is a flowchart illustrating an example method of operating an electronic device, according to various embodiments.

FIG. 8G is a flowchart illustrating an example method 802 of operating an electronic device, according to various embodiments. The method 802 of operating the electronic device according to various embodiments may further include operation S718, compared with the method 800 of operating the electronic device of FIG. 8A. Components of the method 802 of operating the electronic device that are the same as or similar to the components of the methods 800 and 801 of operating the electronic device are indicated by the same reference numerals or characters, and thus may not be repeated here.

According to an embodiment of the disclosure, searching operation S710 shown in FIG. 8G may not be performed in response to reception of a user input as described in searching operations S702 and S710 shown in FIG. 8B. For example, in the method 802 of operating the electronic device, operation S702 may be automatically performed in response to a certain event. When operation S702 is automatically performed, operation S718 may be performed in the method 802 of operating the electronic device, based on an external device being found through scanning in operation S710.

Operation S718 may include operations S718-1 and S718-2.

Referring to FIG. 8G, operation S718-1 included in the method 802 of operating the electronic device may correspond to an operation of outputting the user interface screen image 840 described above with reference to FIG. 8D. Operation S718-1 may also correspond to an operation of outputting the user interface screen image 850 described above with reference to FIGS. 8E and 8F. Thus, a repeated description thereof may not be repeated here.

In the method 802 of opeating the electronic device, a user input may be received in correspondence with a user interface screen image (for example, 840) output in operation S718-1 (S718-2). Operation S718-2 may correspond to an operation of receiving the user input corresponding to the user interface screen image 840 described above with reference to FIG. 8D. Operation S718-1 may also correspond to an operation of receiving the user input corresponding to the user interface screen image 860 described above with reference to FIGS. 8E and 8F. Thus, a repeated description thereof may not be repeated here.

Figure 9:
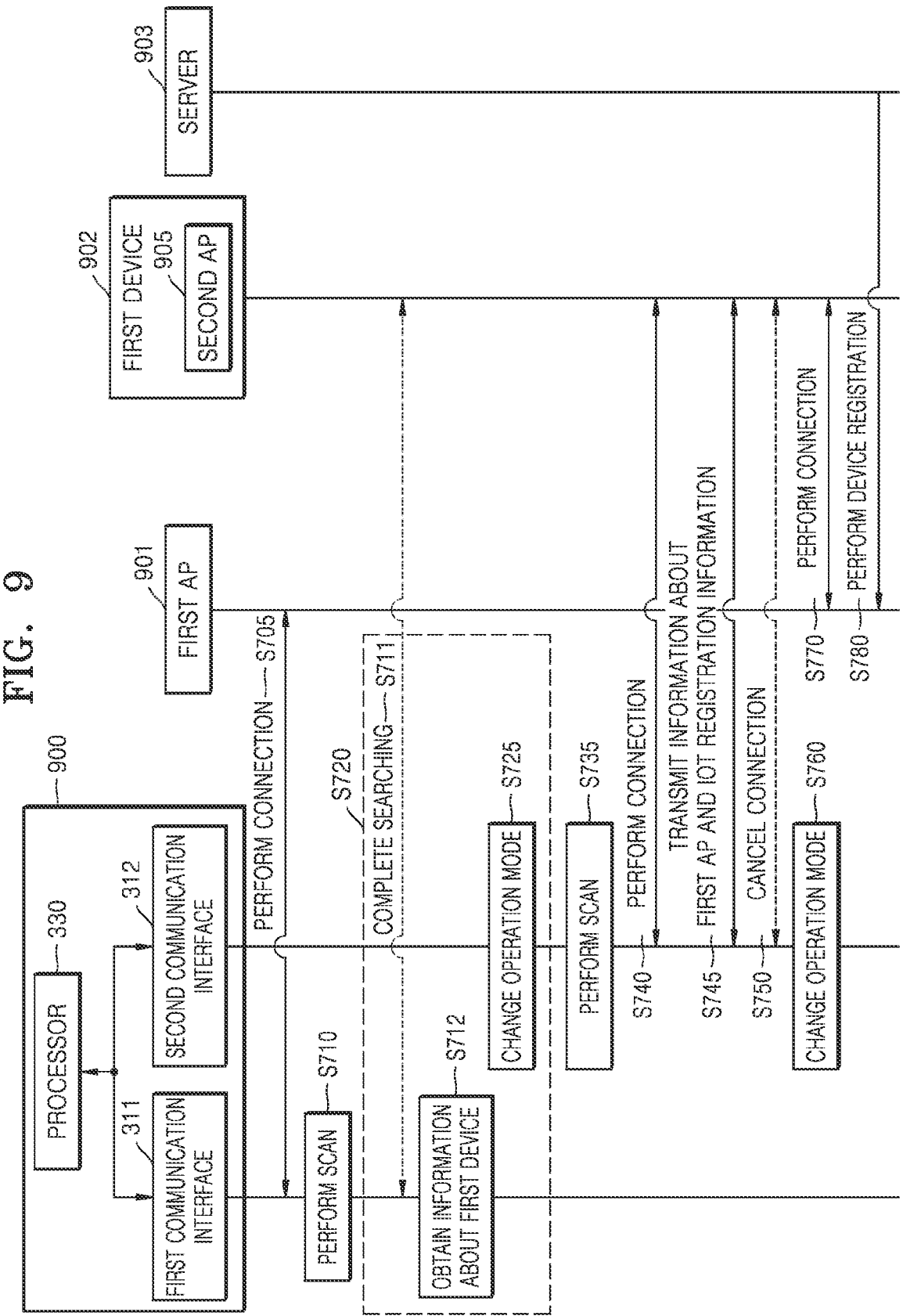
FIG. 9 is a signal flow diagram illustrating example operations performed by an electronic device according to various embodiments.

FIG. 9 is a signal flow diagram illustrating example operations performed by an electronic device 900 according to various embodiments. Referring to FIG. 9, the electronic device 900 corresponds to the electronic device 160, 300, 400 or 500 according to an embodiment of the disclosure described above with reference to FIGS. 1 through 8A. The electronic device 900, a first AP 901, a second AP 905, and a first device 902 may correspond to the electronic device 300, the first AP 610, the second AP 660, and the first device 650 of FIG. 6, respectively. Accordingly, components of FIG. 9 that are the same as or similar to those of FIGS. 3 through 8A are illustrated using the same reference numerals, and descriptions of FIG. 9 that are the same as those given above with reference to FIGS. 3 through 8A may not be repeated here. In FIG. 9, a server 903 may be a server for providing an IoT platform or an IoT service, and may be referred to as an IoT server. For example, the server 903 may be formed as a cloud or a cloud server. In this case, the server 903 may be referred to as an 'IoT cloud'. The server 903 may be a relay server used to provide an IoT platform or an IoT service. According to the embodiment of FIG. 9, the server 903 may refer to a server that is a target in which the first device 902 wanting to be included in the IoT platform is to be registered.

Referring to FIG. 9, the electronic device 900 is connected to the first AP 901 (S705). For example, communication connection between the first communication interface 311 and the first AP 901 is completed and maintained.

The first communication interface 311 may search for an activated AP (for example, an activated Soft AP) (S710). The AP search in operation S710 may be referred to as a 'scan' operation. For example, the first communication interface 311 may transmit a radio signal to neighboring electronic devices while operating as a Wi-Fi station, and may receive a response signal corresponding to the transmitted radio signal. For example, the first communication interface 311 may transmit a probe request signal to a surrounding area. When an external electronic device including an activated AP exists in the surrounding area of the electronic device 900, the second AP 905, which is an activated Soft AP of the external electronic device (for example, the first device 902), may receive a probe request signal transmitted by the electronic device 900. Then, the first device 902 may transmit a probe response signal corresponding to the probe request signal. Accordingly, the first communication interface 311 may receive the probe response signal. In other words, the first communication interface 311 may recognize that the first device 902 exists, based on the received probe response signal.

Based on searching operation being completed (S711), operation S720 described above with reference to FIGS. 7 and 8A may include operation S712 of obtaining information about the found first device 902, and operation S725 of changing the operation mode of the second communication interface 312.

For example, when searching for an external electronic device is completed according to a result of the scanning in operation S710 (S711), the processor 330 may obtain information about the first device 902, which is a found device (S712). For example, the processor 330 may obtain information about the first device 902 included in a response signal received as a result of the scanning in operation S710 (for example, a probe response signal).

The information about the first device 902 may include information necessary for communication connection with the first device 902. For example, the information about the first device 902 may be information (for example, network information to be described later) about a second AP 905 included in the first device 902. For example, the information about the second AP 905, which is information necessary to specify or identify the second AP 905, may include the name of a Soft AP, the ID information of the Soft AP, the SSID of the Soft AP, and/or the MAC Address of the Soft AP.

For example, the probe response signal received by the electronic device 900 as a result of the scanning in operation S710 may include network information. The network information may be information about an activated Soft AP, for example, the second AP 905, and may include the name of a Soft AP, the ID information of the Soft AP, the SSID of the Soft AP, and/or the MAC Address of the Soft AP. For example, probe response information may include the SSID and MAC address of the Soft AP (for example, the second AP 905).

When the first communication interface 311 receives the response signal (for example, the probe response signal), the information about the first device 902 may be obtained in response to the received response signal (S712). For example, the first communication interface 311 may transmit the received response signal to the processor 330, and the processor 330 may obtain the information about the first device 902 from the received response signal. The information about the first device 902 obtained in operation S712 (for example, information about the second AP 905) may be used when the second communication interface 312 connects to the second AP 905 in operation S740, which will be described below. In other words, in operation S740, the second communication interface 312 may connect to the second AP 905 using the information about the first device 902 obtained in operation S712 (for example, information about the second AP 905). Operation S712 may be performed only when the user input received in operation S718 described above with reference to FIGS. 8B through 8G is a user input of requesting communication connection with a found first device (for example, a user input corresponding to selection of the 'Yes' key 832 of the user interface screen image 840 of FIG. 8D). When the user input received in operation S718 described above with reference to FIGS. 8B through 8G is a user input of not requesting communication connection with a found first device (for example, a user input corresponding to selection of the 'No' key 833 of the user interface screen image 840 of FIG. 8D), subsequent operations including operation S712 may not be performed.

The processor 330 may change the operation mode of the second communication interface 312 from the second mode to the first mode (S725). Because the operation mode of the second communication interface 312 has been changed in operation S725, the second communication interface 312 may perform communication by operating as a Wi-Fi station. The second communication interface 312 operating as a Wi-Fi station may perform Wi-Fi communication by connecting to an AP.

When the operation mode of the second communication interface 312 is changed to the first mode, the second communication interface 312 may re-perform the operation S710 corresponding to a scan operation (S735). For example, the second communication interface 312 may perform operation S725 to determine whether an activated AP to which the second communication interface 312 desires to connect exists or determine whether a device including the activated AP exists.

Operation S720 will now be described in greater detail below with reference to FIG. 10.

Figure 10:
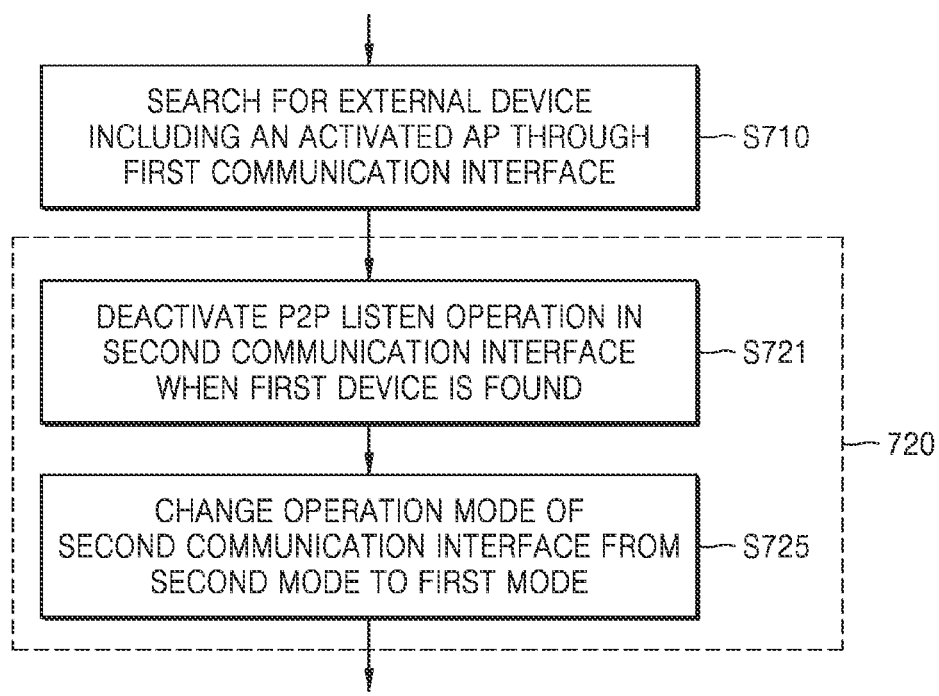
FIG. 10 is a flowchart illustrating an example operation mode changing operation performed by an electronic device according to various embodiments.

FIG. 10 is a flowchart illustrating an example operation mode changing operation performed by an electronic device according to various embodiments. Components of FIG. 10 that are the same as or similar to the components of FIGS. 7 and 9 are indicated by the same reference numerals or characters.

Referring to FIG. 10, the processor 330 included in the electronic device (for example, 160, 300, 400, 500, or 900) according to an embodiment of the disclosure may search for an external device including an activated AP using the first communication interface 311 connected to the first AP 901 (S710), and, when the external device including the activated AP (for example, the first device 902 including the second AP 905) is found, may disable a P2P listen operation performed by the second communication interface 312 to stand by communication connection based on Wi-Fi Direct (S721). The processor 330 may change the operation mode of the second communication interface 312 from the second mode to the first mode.

The P2P listen operation may refer to an operation of monitoring whether a wireless signal is transmitted between devices. For example, at least two devices capable of performing communication based on Wi-Fi Direct may transmit or receive a wireless signal based on the Wi-Fi Direct standard. For example, the P2P listen operation may refer to a state or operation of standing by when a counterpart electronic device (not shown) transmits a wireless signal based on the Wi-Fi Direct standard, in order for the electronic device (for example, 900) to receive the transmitted wireless signal.

When the operation mode of the second communication interface 312 is basically set to be the second mode, the second communication interface 312 may perform the P2P listen operation. In other words, while the second communication interface 312 is in a second operation mode, the P2P listen operation may be an activated state. When the operation mode of the second communication interface 312 is changed from the second mode to the first mode, communication based on Wi-Fi Direct is stopped, and communication operating as a Wi-Fi station starts. Thus, the second communication interface 312 may deactivate the P2P listen operation to stop monitoring where the wireless signal based on the Wi-Fi Direct standard is transmitted.

Referring back to FIG. 9, when the first device 902 including the second AP 905, which is an activated Soft AP, is found as a result of the searching in operation S735, the second communication interface 312 may perform communication connection to connect to the second AP 905 (S740). For example, under the control by the processor 330, the second communication interface 312 may perform communication connection with the second AP 905. For example, the processor 330 may obtain information necessary for the communication connection with the second AP 905 (for example, the SSID and MAC address of the second AP 905), based on the information about the first device obtained in operation S712. Accordingly, the processor 330 may control the second communication interface 312 to perform the communication connection with the second AP 905 using the information necessary for the communication connection with the second AP 905.

Based on the communication connection between the second communication interface 312 and the second AP 905 being completed in operation S740, the processor 330 may transmit information about the first AP 901 and IoT registration information to the first device 902 via the second communication interface 312 (S745). The information about the first device 901 may include information necessary to connect to the first device 901. For example, the information about the first AP 901 is information about a Wi-Fi network formed by the first AP 901, and may be the name, the ID information, the SSID, the MAC address, and the like of the first AP 901. The IoT registration information may include information necessary to register the first device 902 in a server providing an IoT platform (for example, an IoT server) when trying to include or register the first device 902 in the IoT platform. For example, the IoT registration information may include cloud registration information for registration in the IoT server.

For example, to include the first device 902 in the IoT platform, the first device 902 needs to connect to an AP (e.g., a Home AP) forming a Wi-Fi network used to transmit or receive a control signal or pieces of data according to the IoT platform, and the first device 902 need to be registered in the server 903. Thus, the first device 902 may obtain information about the first AP 902, which is an AP forming the Wi-Fi network, and information necessary to be registered in the server 903, in operation S745.

Based on the information transmission in operation S745 being completed, the operation mode of the second communication interface 312 may be changed from the first mode back to the second mode (S760). For example, the processor 330 may change the operation mode of the second communication interface 312 from the first mode to the second mode. Accordingly, the second communication interface 312 may return to an operation state capable of performing communication based on Wi-Fi Direct.

When the second AP 905 obtains the pieces of information transmitted in operation S745 through the second communication interface 312, the first device 902 may perform the communication connection with the first AP 901 (S770). Then, device registration in the server 903 may be performed (S780).

Figure 11:
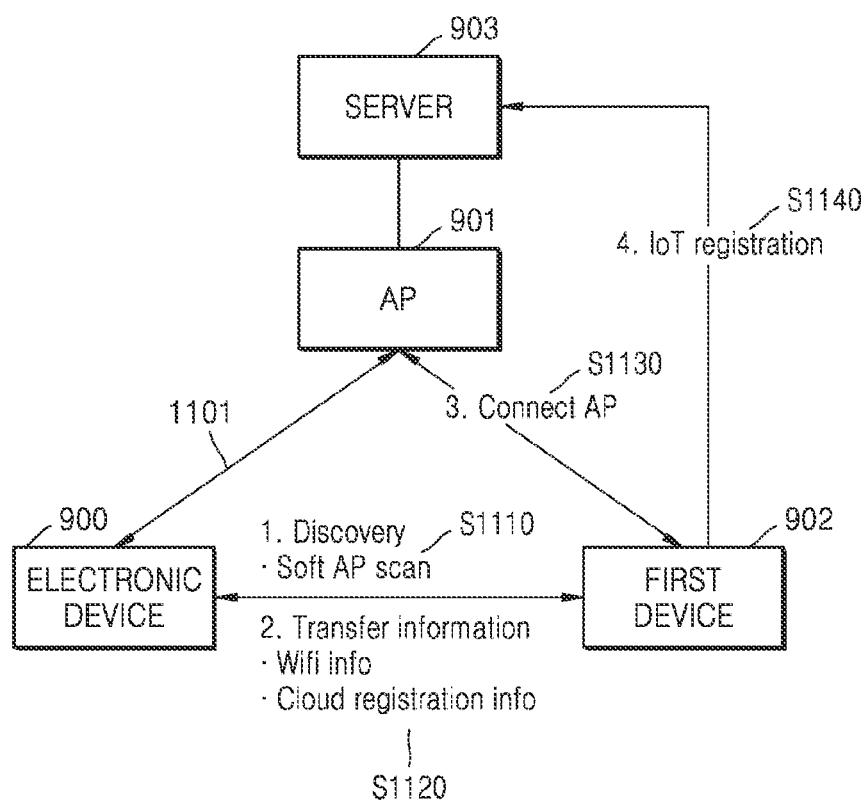
FIG. 11 is a diagram illustrating an example operation of registering a first device in a server using an electronic device according to various embodiments.

FIG. 11 is a diagram illustrating an example operation of registering a first device in a server using an electronic device according to various embodiments. Components of FIG. 11 that are the same as or similar to those of FIG. 9 are illustrated using the same reference numerals, and descriptions of FIG. 11 that are the same as or similar to those given above with reference to FIG. 9 may not be repeated here.

Referring to FIG. 11, operation S1110 may correspond to operations S710 and S711 of FIG. 9. The electronic device 900 may discover an activated Soft AP by performing a scan operation (S1110).

Operation S1110 may be followed by operation S1120. Operation S1120 may correspond to operations S740 and S745 of FIG. 9. For example, the electronic device 900 may perform communication connection between the second communication interface 312 and the second AP 905 included in the first device 902 (S740), and may transmit information about the first AP 901 (indicated by 'Wifi info' in FIG. 11) and IoT registration information (indicated by 'cloud registration info' in FIG. 11) to the first device 902 (S1120).

Operation S1110 may be followed by operation S1130. Operation S1130 may correspond to operation S770 of FIG. 9.

Operation S1130 may be followed by operation S1140. Operation S1140 may correspond to operation S780 of FIG. 9.

As described above with reference to FIGS. 1 through 11, the electronic device 160, 300, 400, 500, or 900 according to an embodiment of the disclosure may enable the first device 902 to perform communication connection with the first AP 901 (S1130) and perform registration in the server 903 (S1140), while maintaining communication connection 1101 with the first AP 901.

Thus, the communication connection 1101 between the electronic device 900 and the first AP 901 does not need to be disconnected to register the first device 902 in the server 903, and communication connection is seamlessly maintained to thereby increasing the stability of communication.

Figure 12:
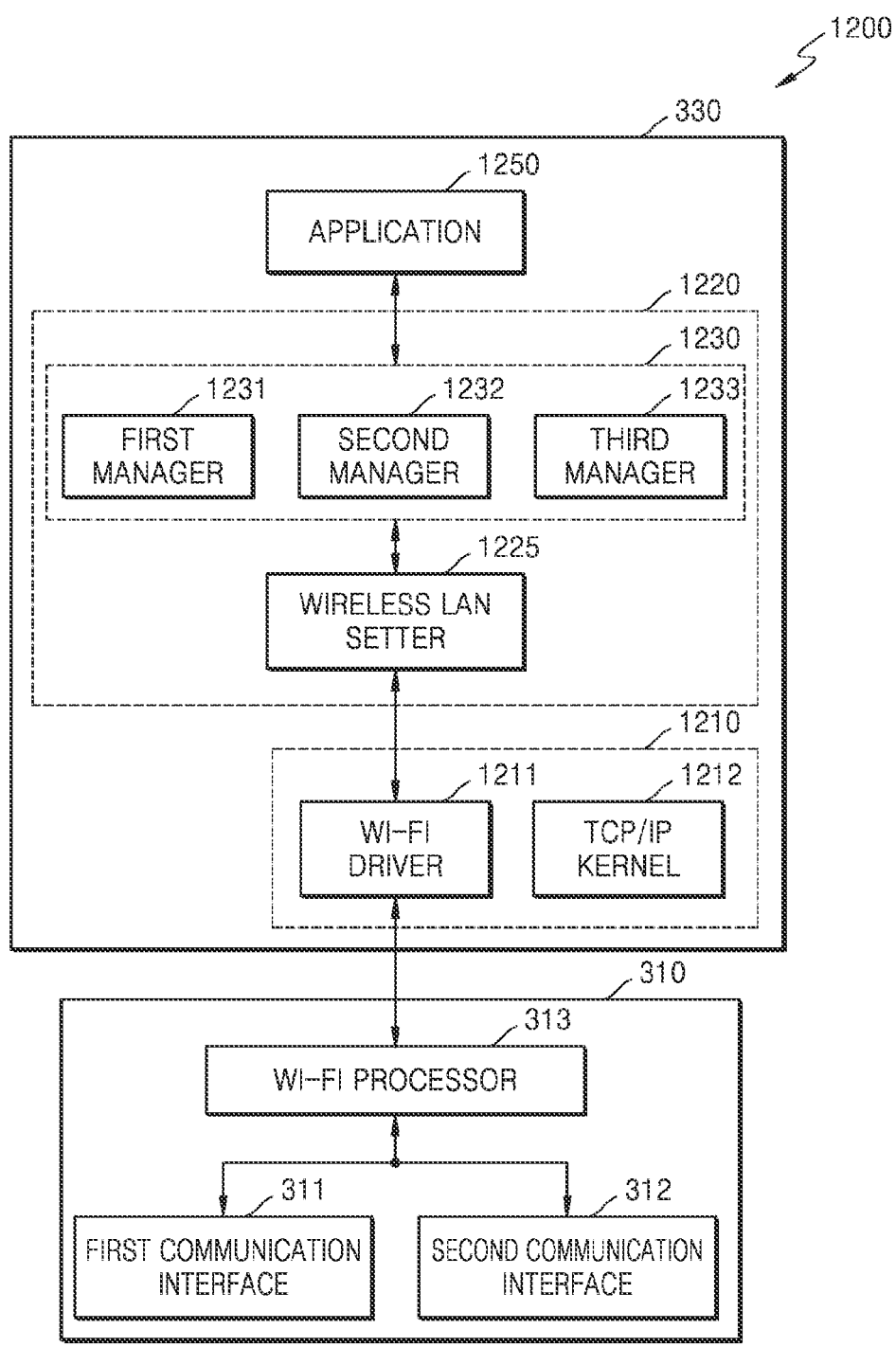
FIG. 12 is a block diagram illustrating an example configuration of an electronic device according to various embodiments.

FIG. 12 is a block diagram illustrating an example configuration of an electronic device 1200 according to various embodiments. For example, the electronic device 1200 of FIG. 12 may correspond to the electronic device 160, 300, 400, 500, or 900 described above with reference to FIGS. 1 through 11. Components of FIG. 12 that are the same as or similar to the components of FIG. 3 are indicated by the same reference numerals or characters. Accordingly, descriptions of the electronic device 1200 of FIG. 12 that are the same as or similar to those made with reference to FIGS. 1 through 11 may not be repeated here.

Referring to FIG. 12, the processor 330 may include an application 1250, an operation system 1220, and a kernel 1210.

For example, the application 1250, the operation system 1220, and the kernel 1210 may be formed separately from one another by software. For example, each of the application 1250, the operation system 1220, and the kernel 1210 may be formed as a set of at least one instruction to perform operations distinguished from one another by the at least one instruction. As another example, the application 1250, the operation system 1220, and the kernel 1210 may be formed on different chips distinguished from one another by hardware.

Each of the application 1250, the operation system 1220, and the kernel 1210 may be formed as at least one processor. A detailed structure of a processor has been described with reference to FIG. 3, and thus a redundant description thereof may not be repeated here.

The kernel 1210 may be formed as a driver that transmits or receives a signal to or from the Wi-Fi module 310. For example, the kernel 1210 may include a Wi-Fi driver 1211 in charge of a signal transmitted or received through a wireless communication network, and a Transmission Control Protocol/Internet Protocol (TCP/IP) kernel 1212 in charge of a signal transmitted or received through a wireless communication network. The kernel 1210 may be referred to as a driver, and the Wi-Fi driver 1211 may be referred to as a Wi-Fi kernel.

For example, the Wi-Fi driver 1211 may control and perform transmission or reception of data according to the Wi-Fi communication standard. For example, the Wi-Fi driver 1211 may transmit an event, a signal, a command, a request, and/or information generated by the application 1250 or the operation system 1220 to the Wi-Fi module 310. Alternatively, the Wi-Fi driver 1211 may transmit an event, a signal, a command, a request, and/or information received from the Wi-Fi module 310 to a wireless LAN setter 1225.

The TCP/IP the kernel 1212 may control and perform transmission or reception of data according to a TCP/IP communication protocol.

The operation system 1220 may control connection and disconnection of the wireless communication network. For example, the operation system 1220 may include the wireless LAN setter 1225 and a wireless communication management unit 1230.

The wireless LAN setter 1225 may perform a setting necessary for Wi-Fi network connection by performing a wireless LAN setting called a WPA supplicant. For example, the wireless LAN setter 1225 may perform a wireless LAN setting under the control by the wireless communication management unit 1230 performing an operation necessary for Wi-Fi communication control. In FIGS. 13 through 18, the wireless LAN setter 1225 is indicated by a WPA supplicant 1225.

The wireless communication management unit 1230 may control an overall operation related to wireless communication. For example, the wireless communication management unit 1230 may include a first manager 1231 for controlling wireless communication based on the Wi-Fi network, and a second manager 1232 for controlling P2P communication. The wireless communication management unit 1230 may further include a third manager 1233 for changing and managing the operation mode of the second communication interface 312, which is an interface in charge of P2P communication within the Wi-Fi module 310.

For example, each of the first manager 1231 and the second manager 1232 may manage communication connection/disconnection through the first communication interface 311 and communication connection/disconnection through the second communication interface 312.

Although the third manager 1233 is a separate component from the first manager 1231 and the second manager 1232 in FIG. 12, the third manager 1233 may be included in the second manager 1232.

The application 1250 may perform actual control for connecting, maintaining, or changing a Wi-Fi network.

Detailed operations of the processor 330 including the application 1250, the wireless LAN setter 1225, and the kernel 1210 will be described in greater detail below with reference to FIG. 13. The application 1250, the wireless LAN setter 1225, and the kernel 1210 of FIG. 12 are illustrated as a middleware, a WPA_Supplicant, and a driver, respectively, in FIG. 13.

A detailed operation of the electronic device 1200 will now be described in greater detail with reference to FIGS. 13 through 18.

Figure 13:
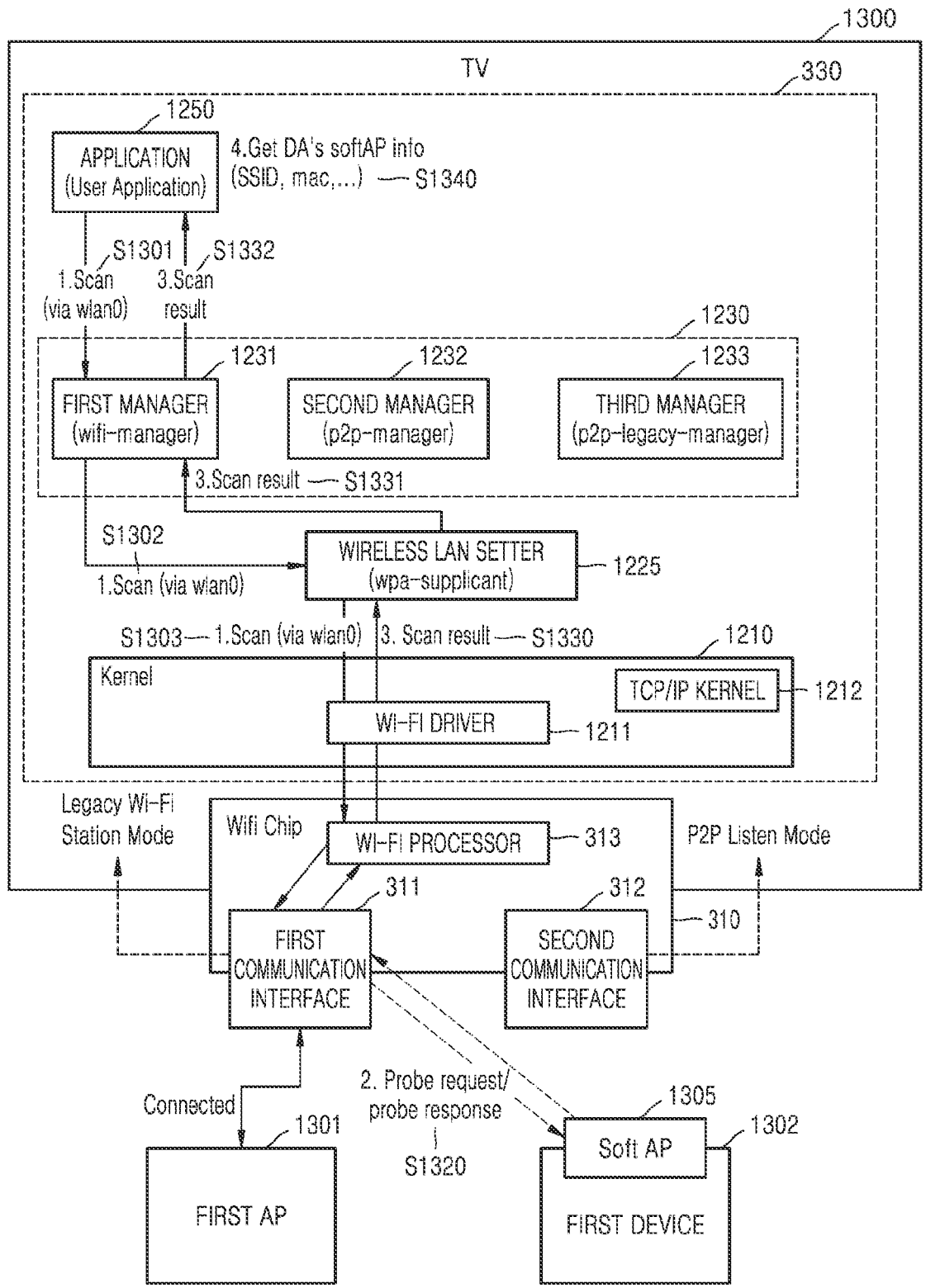
FIG. 13 is a diagram illustrating an example operation of an electronic device according to various embodiments.

FIG. 13 is a diagram illustrating an example operation of an electronic device 1300 according to various embodiments. Components of the electronic device 1300 of FIG. 13 that are the same as or similar to those of the electronic device 1200 of FIG. 12 are indicated by the same reference numerals or characters, and thus may not be repeated here. English names of detailed components included in the electronic device 1300 are indicated in parentheses.

For example, FIG. 13 is a diagram for explaining operation S710 through the first communication interface 311 in detail. For example, operation S710 corresponding to a scan operation may be performed in operations S1301 through S1332 of FIG. 13.

Referring to FIG. 13, a first AP 1301, a Soft AP 1305, and a first device 1302 may correspond to the first AP 901, the second AP 905, and the first device 902 of FIG. 9, respectively.

The application 1250 may be referred to as a user application. A communication interface operating as a Wi-Fi station and a communication interface performing communication based on P2P communication may be indicated by or referred to as 'wlan0' and 'p2p0', respectively. For example, when the basic operation mode of each of the first communication interface 311 and the second communication interface 312 is the first mode operating as a Wi-Fi station and the second mode in which communication is performed based on P2P communication, the first communication interface 311 and the second communication interface 312 both existing in the basic operation mode may be referred to as 'wlan0' and 'p2p0', respectively. For example, 'Scan (via wlan0)' indicated in FIG. 13 may refer to a scan through a first communication interface.

The application 1250 may transmit to the first manager 1231 a scan start command for searching for whether an activated AP (e.g., an activated Soft AP) exists in neighboring electronic devices (S1301). For example, the scan start command may be a command instructing a scan to be performed through a communication interface operating as a Wi-Fi station. For example, the scan start command generated and transmitted in operation S1301 may be finally transmitted to the first communication interface 311 included in the Wi-Fi module 310 via a transmission operation S1302 and a transmission operation S1303.

The Wi-Fi module 310 may further include a Wi-Fi processor 313. The Wi-Fi processor 313 may process a signal transmitted by the kernel 1210 or process a signal received from at least one of the first communication interface 311 or the second communication interface 312 and may transmit the processed signal to the processor 330. For example, the scan start command transmitted in operation S1301 may be transmitted to the Wi-Fi processor 313, and the Wi-Fi processor 313 may transmit the scan start command to the first communication interface 311.

In response to the scan start command, the first communication interface 311 may transmit a probe request signal and may receive a probe response signal corresponding to the probe request signal (S1320). For example, when the first device 1302 including the activated Soft AP 1305 exists around the electronic device 1300, the activated Soft AP 1305 of the first device 1302 may receive the probe request signal from the electronic device 1300. Then, the first device 1302 may transmit a probe response signal corresponding to the probe request signal. Accordingly, the first communication interface 311 may receive the probe response signal.

The Wi-Fi processor 330 of the first communication interface 311 may transmit a scan result informing that the first device 1302 has been found, in response to the probe response signal received by the first communication interface 311 (S1330). Then, the scan result may be transmitted to the application 1250 via a transmission operation S1331 and a transmission operation S1332.

The application 1250 may obtain information about a first device, based on the received scan result (S1340). Operation S1340 corresponds to operation S712, and thus a detailed description thereof may not be repeated here.

In FIG. 13, while the above-described scan operation is being performed, the second communication interface 312 may be in a P2P listen mode state that is an operation mode in which a P2P listen operation is activated. The P2P listen mode may be an operation mode included in the second mode.

Figure 14:
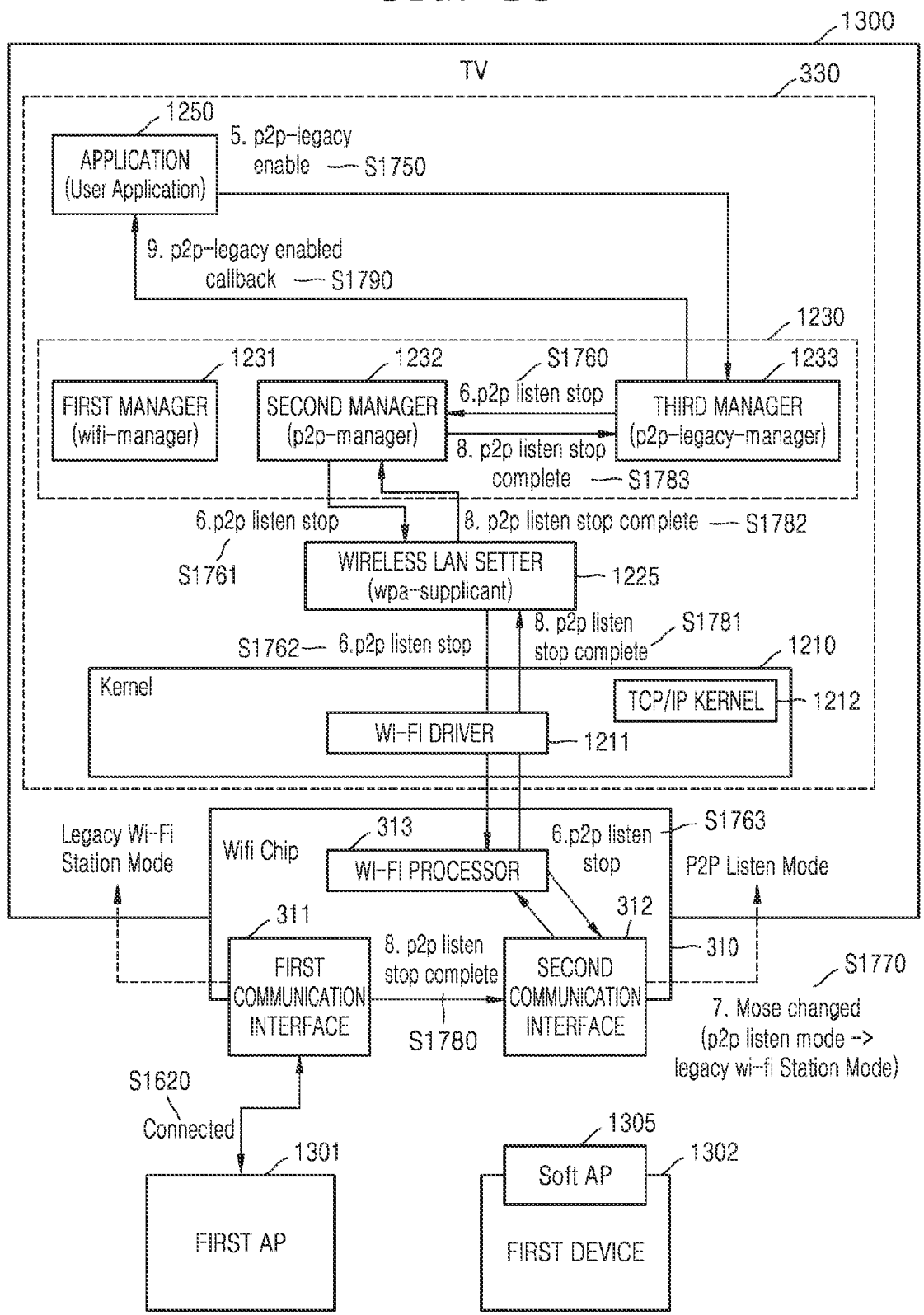
FIG. 14 is a diagram illustrating an example operation of an electronic device according to various embodiments.

FIG. 14 is a diagram illustrating an example operation of the electronic device 1300 according to various embodiments. Accordingly, components of FIG. 14 that are the same as or similar to those of FIG. 13 are illustrated using the same reference numerals, and descriptions of FIG. 14 that are the same as those given above with reference to FIG. 13 may not be repeated here.

FIG. 14 is a diagram for explaining operation S720 in detail. For example, operation S720 may be performed in operations S1750 through S1790 of FIG. 14.

Referring to FIG. 14, based on the activated Soft AP 1305 being found as described above with reference to FIG. 13, the application 1250 may transmit to the third manager 1233 a command instructing that the second communication interface 312 is set as the first mode operating as a Wi-Fi station (S1750).

In response to the command transmitted in operation S1750, the third manager 1233 may transmit to the second manager 1232 a signal requesting a P2P listen operation performed by the second communication interface 312 in order to stand by communication connection based on Wi-Fi Direct to be disabled (S1760).

The requesting signal transmitted in operation S1760 may be finally transmitted to the second communication interface 312 via operations S1761, S1762 and S1763. Accordingly, the second communication interface 312 may deactivate the P2P listen operation and change the operation mode from the second mode to the first mode (S1770).

The second communication interface 312 may transmit to the Wi-Fi processor 313 a signal ('p2p listen stop') informing that the P2P listen operation has been stopped due to a change in the operation mode (S1763). Then, the signal transmitted in operation S1763 may be transmitted to the wireless LAN setter 1225 via the Wi-Fi driver 1211 (S1781). Then, in response to the signal transmitted in operation S1781, a signal ('callback') informing that connection of the Soft AP 1305 through the second communication interface 312 is possible may be transmitted to the application 1250 via signal transmission in operations S1782, S1783 and S1790 (S1790). The 'callback' may refer to a signal informing that a certain accident or a certain event has occurred.

Figure 15:
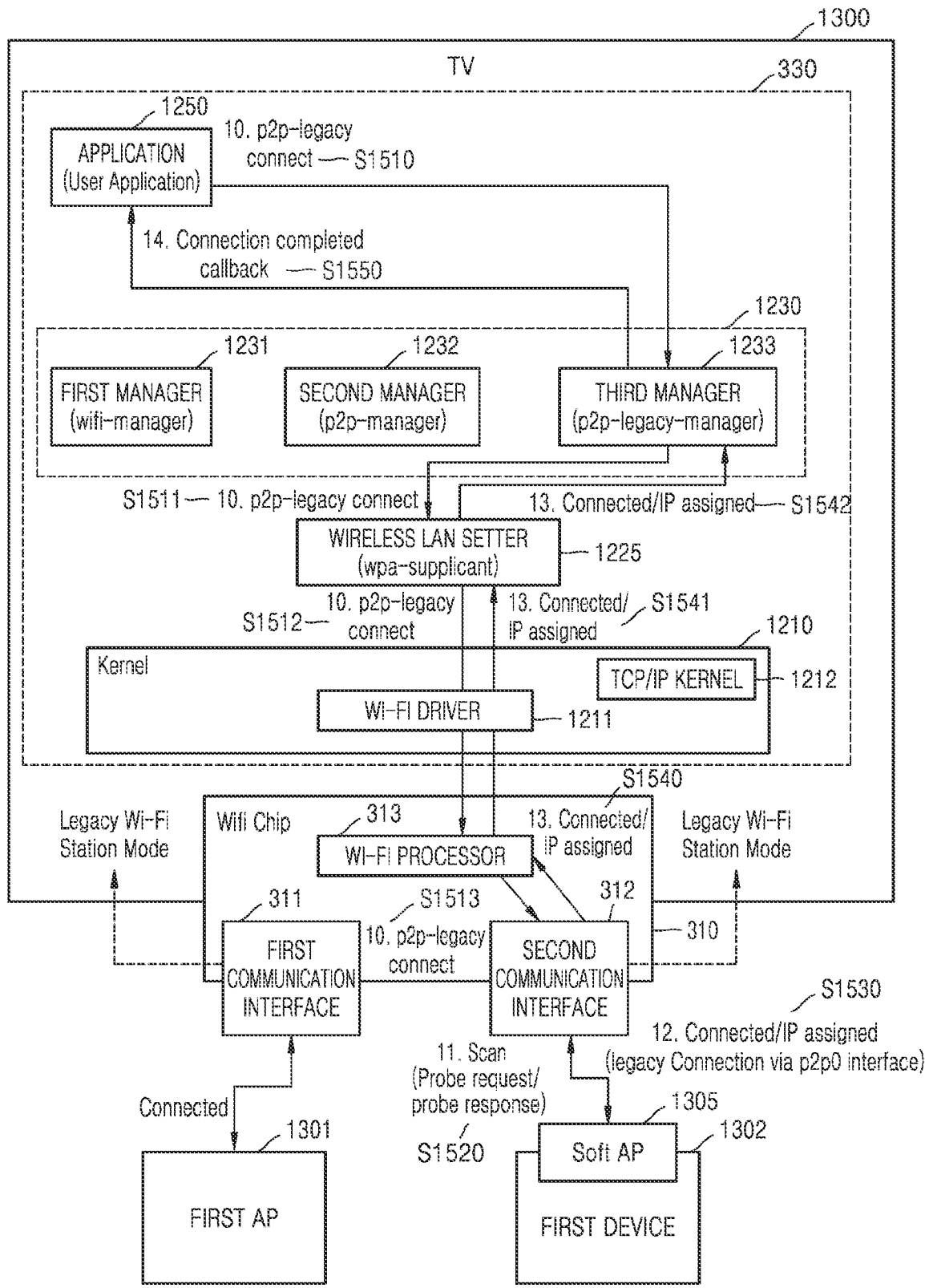
FIG. 15 is a diagram illustrating an example operation of an electronic device according to various embodiments.

FIG. 15 is a diagram illustrating an example operation of the electronic device 1300 according to various embodiments. Accordingly, components of FIG. 15 that are the same as or similar to those of FIG. 13 are illustrated using the same reference numerals, and descriptions of FIG. 15 that are the same as those given above with reference to FIG. 13 may not be repeated here.

FIG. 15 is a diagram for explaining operations S735 and S740 in detail. For example, operations S735 and S740 may be performed in operations S1510 through S1550 of FIG. 15.

Referring to FIG. 15, after the mode changing operation described above with reference to FIG. 14 is completed, the application 1250 may transmit to the third manager 1233 a command instructing the second communication interface 312 to connect to the activated Soft AP 1302 (S1510). In response to the command in operation S1510, the third manager 1233 may transmit to the wireless LAN setter 1225 a signal requesting the second communication interface 312 to connect to the activated Soft AP 1302 (S1511).

The requesting signal transmitted in operation S1511 may be finally transmitted to the second communication interface 312 via operations S1512 and S1513. Accordingly, the second communication interface 312 may perform operations for performing communication connection with the Soft AP 1305.

For example, the second communication interface 312 may perform search operation searching for an activated Soft AP again (S1520). Operation S1520 corresponds to operation S735, and thus a repeated description thereof will be omitted. The second communication interface 312 may perform communication connection with the found Soft AP 1305 (S1530). For example, the second communication interface 312 perform communication connection with the Soft AP 1305, based on information about the Soft AP 1305 obtained in operation S712 (S1530). Based on communication connection with the Soft AP 1305 being completed, the second communication interface 312 may be normally assigned an IP for connecting to a network formed by the Soft AP 1305.

The second communication interface 312 may transmit to the Wi-Fi processor 313 a signal informing that communication connection with the Soft AP 1305 has been completed (S1540). The signal transmitted in operation S1540 may be transmitted to the wireless LAN setter 1225 via the Wi-Fi driver 1211 (S1541). In response to the signal transmitted in operation S1541, a signal ('callback') informing that connection with the Soft AP 1305 through the second communication interface 312 has been completed may be transmitted to the application 1250 via signal transmission in operation S1542 (S1550).

Figure 16:
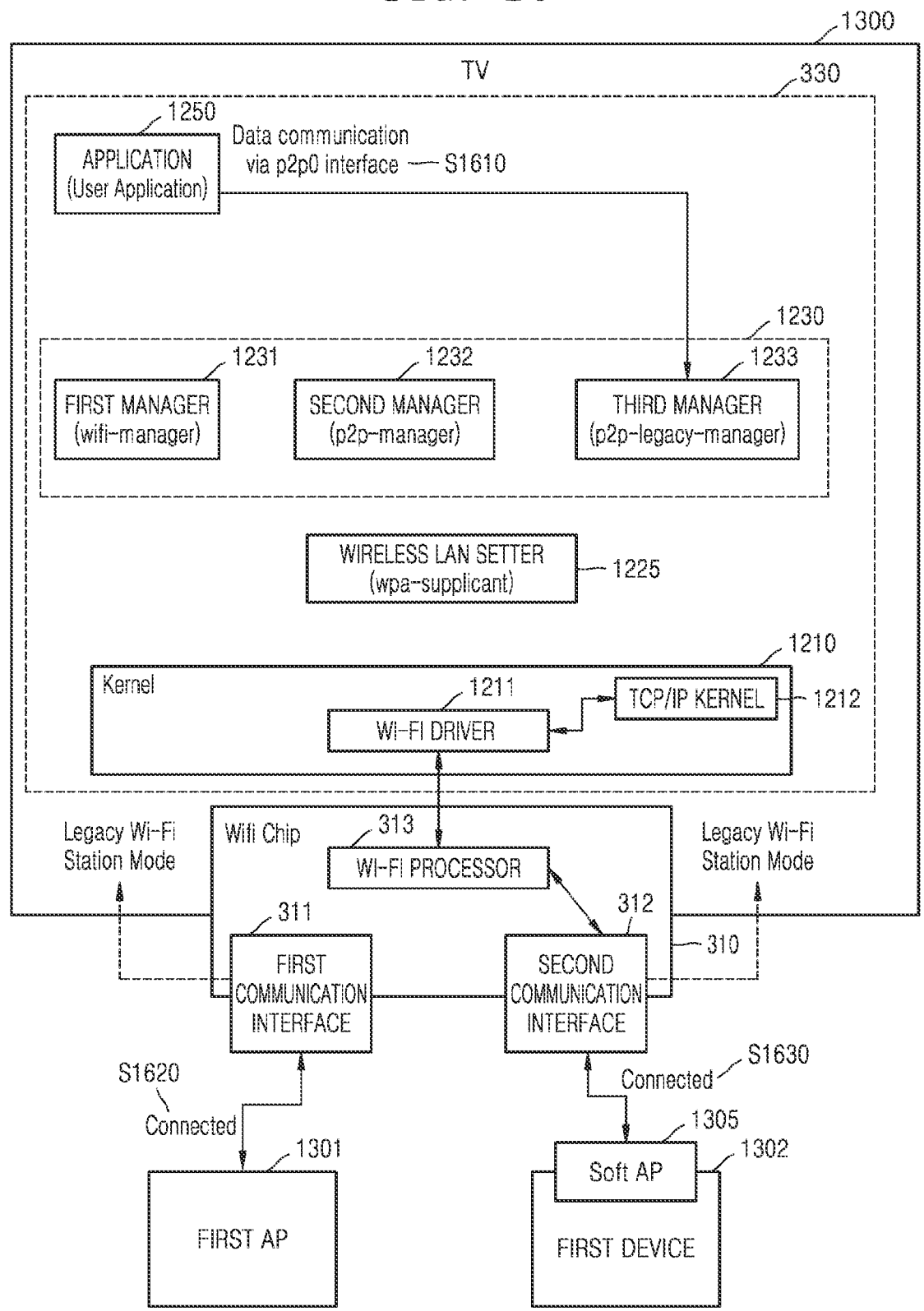
FIG. 16 is a diagram illustrating an example operation of an electronic device according to various embodiments.

FIG. 16 is a diagram illustrating an example operation of the electronic device 1300 according to various embodiments. Accordingly, components of FIG. 16 that are the same as or similar to those of FIG. 13 are illustrated using the same reference numerals, and descriptions of FIG. 16 that are the same as those given above with reference to FIG. 13 may not be repeated here.

Referring to FIG. 16, after the operations described above with reference to FIG. 15 are performed, the electronic device 1300 may maintain connection to the first AP 1301 through the first communication interface 311 (S1620), and may complete connection to the Soft AP 1305 through the second communication interface 312 (S1630). Accordingly, the application 1250 may control execution of data communication so that the information about the first AP 901 and the IoT registration information are transmitted to the first device 1302 through the second communication interface 312 (S1610). For example, the application 1250 may control the third manager 1233 so that operation S745 is performed. Thus, the first device 1302 may receive the information about the first AP 901 and the IoT registration information.

Figure 17:
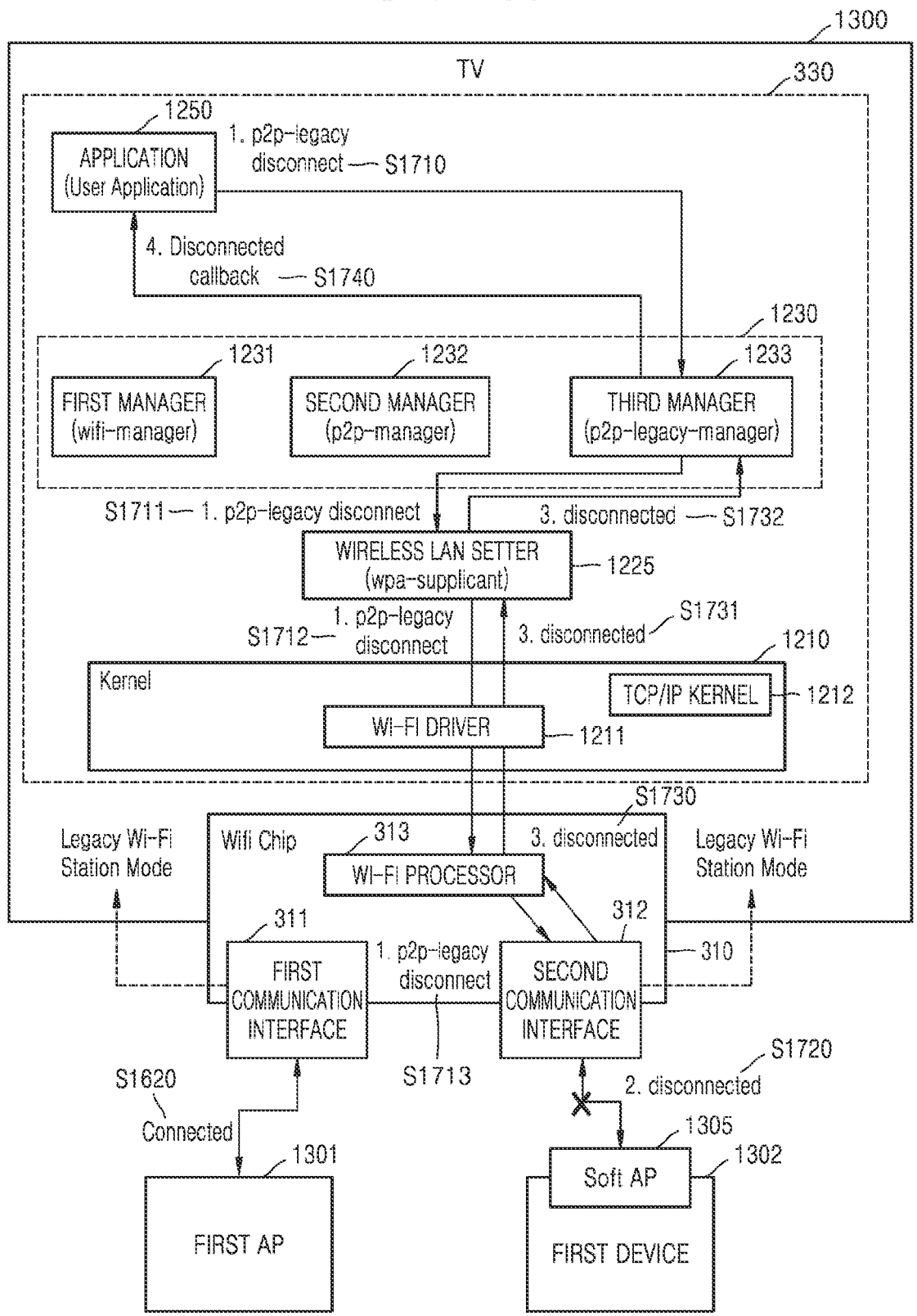
FIG. 17 is a diagram illustrating an example operation of an electronic device according to various embodiments.

FIG. 17 is a diagram illustrating an example operation of the electronic device 1300 according to various embodiments. Accordingly, components of FIG. 17 that are the same as or similar to those of FIG. 13 are illustrated using the same reference numerals, and descriptions of FIG. 17 that are the same as those given above with reference to FIG. 13 may not be repeated here.

FIG. 17 is a diagram for explaining operation S750 shown in FIG. 9 in detail. For example, operation S750 may be performed in operations S1710 through S1740 of FIG. 17.

Referring to FIG. 17, when operation S745 described above with reference to FIG. 16 is performed, the application 1250 may transmit to the third manager 1233 a command instructing the second communication interface 312 to disconnect from the activated Soft AP 1302 (S1710). In response to the command in operation S1710, the third manager 1233 may transmit to the wireless LAN setter 1225 a signal requesting the second communication interface 312 to disconnect from the activated Soft AP 1302 (S1711).

The requesting signal transmitted in operation S1711 may be finally transmitted to the second communication interface 312 via operations S1712 and S1713. Accordingly, the second communication interface 312 may perform operations for performing communication disconnection from the Soft AP 1305. Thus, the second communication interface 312 may be disconnected from the Soft AP 1305 (S1720).

The second communication interface 312 may transmit to the Wi-Fi processor 313 a signal informing that communication connection with the Soft AP 1305 has been disconnected (S1730). The signal transmitted in operation S1730 may be transmitted to the wireless LAN setter 1225 via the Wi-Fi driver 1211 (S1731). Then, in response to the signal transmitted in operation S1731, a signal ('callback') informing that connection between the Soft AP 1305 and the second communication interface 312 has been disconnected may be transmitted to the application 1250 via signal transmission in operation S1732 (S1740).

Figure 18:
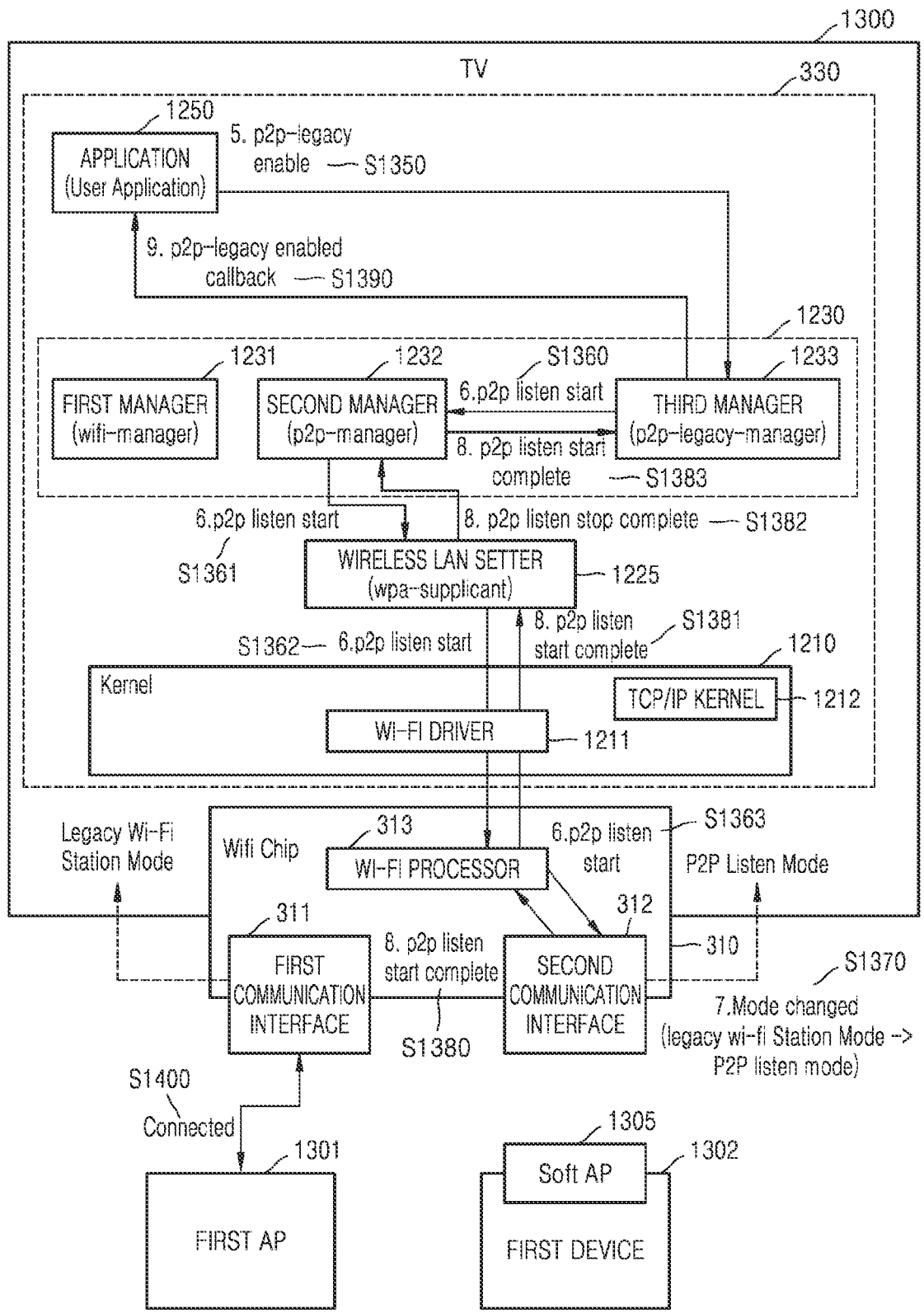
FIG. 18 is a diagram illustrating an example operation of an electronic device according to various embodiments.

FIG. 18 is a diagram illustrating an example operation of the electronic device 1300 according to various embodiments. Accordingly, components of FIG. 18 that are the same as or similar to those of FIG. 13 are illustrated using the same reference numerals, and descriptions of FIG. 18 that are the same as those given above with reference to FIG. 13 may not be repeated here.

FIG. 18 is a diagram for explaining operation S760 in detail. For example, operation S760 may be performed in operations S1350 through S1390 of FIG. 18.

Referring to FIG. 18, when connection between the Soft AP 1305 and the second communication interface 312 is disconnected as described above with reference to FIG. 17, the application 1250 may transmit to the third manager 1233 a command instructing that the second communication interface 312 is set as the second mode to perform P2P communication again (S1350). For example, the application 1250 may transmit to the third manager 1233 a command instructing the operation mode of the second communication interface 312 to be changed from the first mode to the second mode (S1350).

In response to the command in operation S1350, the third manager 1233 may transmit to the second manager 1232 a signal requesting a P2P listen operation performed by the second communication interface 312 to stand by communication connection based on Wi-Fi Direct to start ('p2p listen start') (S1360).

The requesting signal transmitted in operation S1360 may be finally transmitted to the second communication interface 312 via operations S1362 and S1363. Accordingly, the second communication interface 312 may start (or activate) the P2P listen operation, and may change the operation mode from the first mode to the second mode (S1370).

The second communication interface 312 may transmit to the Wi-Fi processor 313 a signal ('p2p listen start complete') informing that starting the P2P listen operation has been completed due to a change in the operation mode (S1380). The signal transmitted in operation S1380 may be transmitted to the wireless LAN setter 1225 via the Wi-Fi driver 1211 (S1381). In response to the signal transmitted in operation S1381, a signal ('callback') informing that the second communication interface 312 is performing the P2P listen operation may be transmitted to the application 1250 via signal transmission in operations S1382 and S1383 (S1390).

As described above with reference to FIGS. 13 through 18, the electronic device 1300 according to an embodiment of the disclosure may serve as a mediator by connecting to the Soft AP 1305, while continuously maintaining communication connection with an existing AP (for example, 1301) while operating as a mediator.

Figure 19:
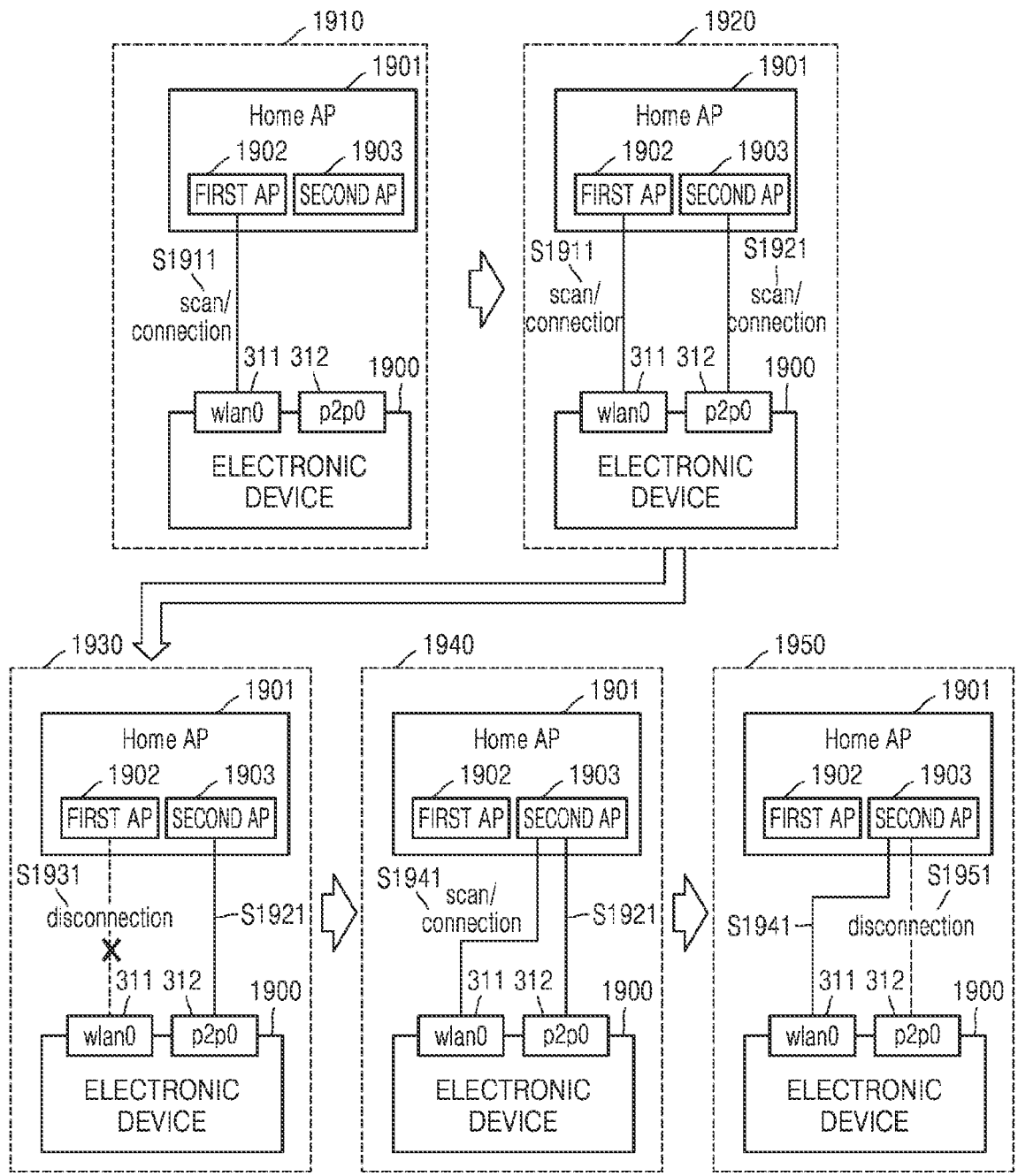
FIG. 19 is a diagram illustrating an example communication connection operation performed by an electronic device according to various embodiments.

FIG. 19 is a diagram illustrating an example communication connection operation performed by an electronic device according to various embodiments. Components of FIG. 19 that are the same as or similar to the components of FIG. 6 are indicated by the same reference numerals or characters. An electronic device 1900 of FIG. 19 may correspond to the electronic device 160, 300, 400, 500, 900, or 1300 described above with reference to FIGS. 1 through 18. Thus, a repeated description thereof may not be repeated in the description of the components illustrated in FIG. 19.

Referring to FIG. 19, a first AP 1902 and a second AP 1903 may correspond to the first AP 610 and the second AP 660 of FIG. 6, respectively. The first AP 1902 and the second AP 1903 may correspond to the first AP 901 and the second AP 905 of FIG. 9, respectively. first AP 1902 and the second AP 1903 may correspond to the first AP 1301 and the second AP 1305 of FIG. 13, respectively.

Figure 20:
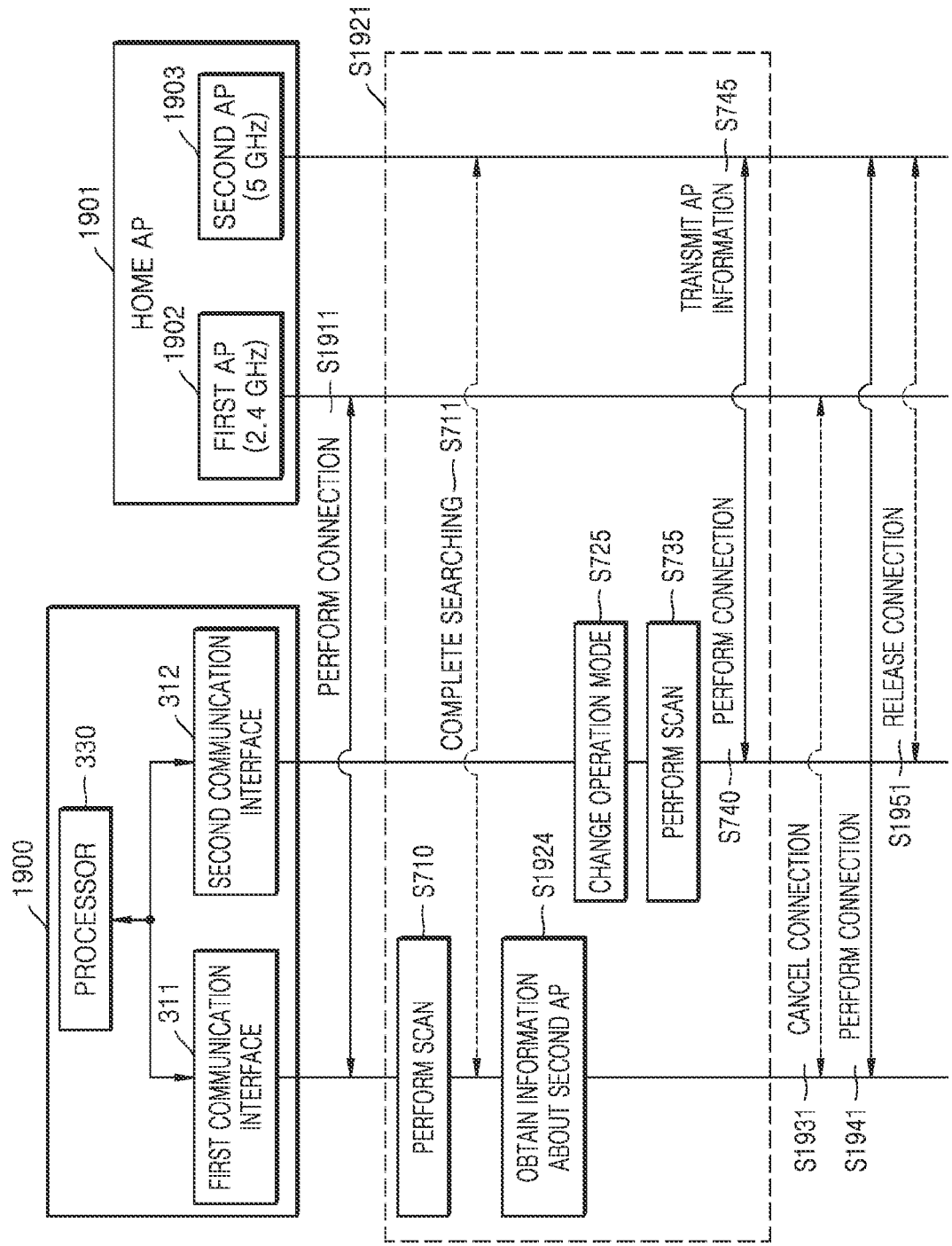
FIG. 20 is a signal flow diagram illustrating an example operation of an electronic device according to various embodiments.

In FIGS. 19 and 20, the first AP 1902 and the second AP 1903 may be included in a single electronic device. For example, the first AP 1902 and the second AP 1903 may be included in a single AP device 1901 that is driven according to a multi-band method to perform communication in each of a plurality of different frequency bands. For convenience of explanation, FIG. 19 illustrates that an AP device including the first AP 1902 and the second AP 1903 and being driven according to a multi-band method is a home AP 1901. The first communication interface 311 and the second communication interface 312 of FIG. 19 are included in the Wi-Fi module 310 as described above with reference to FIGS. 3 through 18. The processor 330 included in the electronic device 1900 is not shown in FIG. 19 for convenience of explanation.

For example, the Home AP 1901 may be an AP including a multi-band method capable of simultaneously broadcasting Wi-Fi signals of a plurality of different frequency bands (e.g., a 2.4 GHz frequency band and a 5 GHz frequency band). In Wi-Fi communication, communication is generally performed between terminals using a Basic Service Set Identifier (BSSID) indicating the MAC address of an AP. An AP supporting multiple bands assign BSSIDs to different frequencies, respectively, and a terminal may access different frequency bands using different BSSIDs.

In general, a 2.4 GHz radio frequency band uses a frequency of a low band and has a long wavelength, and thus provides better reflection and refraction capabilities to avoid obstacles than a 5 GHz radio frequency band. Thus, the 2.4 GHz radio frequency band has a long reception distance and accordingly has a wide coverage. However, in the 2.4 GHz radio frequency band, a phenomenon in which a wireless speed rapidly decreases frequently occurs due to severe signal interference caused because many neighboring APs or smart devices use the same frequency. The 5 GHz radio frequency band is weaker in diffraction and reflection than a low frequency of the 2.4 GHz band, and thus decreases in a reception rate when it is blocked by an obstacle such as a wall. However, the 5 GHz radio frequency band is better in signal sensitivity on a straight line having no obstacles when it uses a higher frequency than the 2.4 GHz radio frequency band, and thus provides less signal interference than the 2.4 GHz radio frequency band, thereby maintaining a fast and stable wireless speed. In other words, 2.4 GHz and 5 GHz have advantages and disadvantages according to their respective characteristics, and a frequency band having optimal performance may vary depending on the location and type of a terminal.

In general, one Wi-Fi module can connect to one AP, and cannot connect to two different APs at the same time. Accordingly, even when an AP including a multi-band method exists, an electronic device may maintain communication connection only to a wireless communication network (e.g., a 2.4 GHz network or a 5 GHz network) corresponding to one frequency band.

According to an embodiment of the disclosure, the second communication interface 312 operating to perform P2P communication may change its operation mode so that the electronic device 1900 including one Wi-Fi module 310 may connect to two different Wi-Fi networks corresponding to two different frequency bands provided by the home AP 1901.

A case where the home AP 1901 includes the first AP 1902 providing communication in a wireless frequency band of 2.4 GHz and the second AP 1903 providing communication in a wireless frequency band of 5 GHz will be described with reference to FIG. 19. FIG. 19 illustrates an embodiment in which, while communication connection based on a Wi-Fi network corresponding to one frequency band between the home AP 1901 and the electronic device 1900 is being maintained without discontinuity, the frequency band of the Wi-Fi network to which the first communication interface 311 connects may be changed. For example, FIGS. 19 and 20 illustrate an embodiment in which the frequency band of the Wi-Fi network to which the first communication interface 311 connects is changed from 2.4 GHz to 5 GHz.

Referring to block 1910, the first communication interface 311 performs scan and connection operations (S1911), and thus is connected to the first AP 1902. Operation S1911 may correspond to operation S705 of FIG. 9. The second communication interface 312 and the second AP 1903 are in an unconnected state.

Referring to block 1920, the operation mode of the second communication interface 312 may be changed from the second mode to the first mode under the control by the processor 330. This operation mode changing operation may correspond to operation S725. Communication connection with the second AP 1903 may be performed through the second communication interface 312 in a changed operation mode (S1921). Operation S1921 may correspond to operation S740.

Referring to block 1930, the first communication interface 311 may disconnect the communication connection in operation S1911 under the control by the processor 330 (S1931). The communication connection between the second communication interface 312 and the second AP 1903 may be maintained (S1921).

Referring to block 1940, the first communication interface 311 may perform communication connection with the second AP 1903 by performing scan and connection operations (S1941). The communication connection between the second communication interface 312 and the second AP 1903 may be maintained (S1921).

Referring to block 1950, based on the communication connection between the first communication interface 311 and the second AP 1903 in operation S1941 being completed, the second communication interface 312 may disconnect the communication connection with the second AP 1903 completed in operation S1921 (S1951).

As described above with reference to FIG. 19, the electronic device 1900 may change the frequency band of the Wi-Fi network to which the first communication interface 311 connects from a first frequency band (for example, 2.4 GHz) to a second frequency band (for example, 5 GHz), while maintaining the Wi-Fi network between the electronic device 1900 and the home AP 1901.

FIG. 20 is a signal flow diagram illustrating an example operation of the electronic device 1900 according to various embodiments. FIG. 20 is a diagram explaining, in greater detail, operations performed by the electronic device 1900 of FIG. 19. FIG. 20 may be a drawing illustrating an operation method of the electronic device 1900. Components of FIG. 20 that are the same as or similar to those of FIGS. 7 and 19 are illustrated using the same reference numerals, and thus descriptions of FIG. 20 that are the same as those given above with reference to FIGS. 7 and 19 may not be repeated here.

Referring to FIG. 20, the first communication interface 311 performs scan and connection operations (S1911), and thus is connected to the first AP 1902. The processor 330 of the electronic device 1900 may control an AP searching operation to be performed through the first communication interface 311.

When searching for the second AP is completed as a result of the scanning in operation S710 (S711), the first communication interface 311 may obtain information about the second AP 1903 (S1942). Operation S1942 may correspond to operation S712. For example, the information about the second AP 1903 may include the name of the second AP, the ID information of the second AP, the SSID of the second AP, and/or the MAC Address of the second AP. For example, probe response information received as a result of the scanning in operation S710 may include the SSID and MAC address of the second AP 1903.

The processor 330 may change the operation mode of the second communication interface 312 from the second mode to the first mode (S725).

When the operation mode of the second communication interface 312 is changed to the first mode, the second communication interface 312 may re-perform operation S710 corresponding to a scan operation (S735). The second communication interface 312 may perform communication connection with the second AP 905 (S740).

In response to the communication connection between the second communication interface 312 and the second AP 1903 being completed in operation S740, the processor 330 may transmit information about the first AP 1902 via the second communication interface 312 (S745).

The first communication interface 311 may release the communication connection in operation S1911 under the control by the processor 330 (S1931). The communication connection between the second communication interface 312 and the second AP 1903 may be maintained.

The first communication interface 311 may perform communication connection with the second AP 1903 by performing scan and connection operations (S1941). TWhen the communication connection between the first communication interface 311 and the second AP 1903 in operation S1941 is completed, the second communication interface 312 may disconnect the communication connection with the second AP 1903 completed in operation S1921 (S1951).

As described above with reference to FIGS. 1 through 20, when an electronic device according to an embodiment of the disclosure is connected to the Wi-Fi network by the IoT platform, even when the electronic device operates as a mediator, the electronic device may maintain a high communication quality by maintaining the Wi-Fi network without discontinuity. Accordingly, the electronic device may implement a reliable IoT environment.

A method of operating the electronic device according to an example embodiment of the disclosure may be embodied as program commands executable by various computer means and may be recorded on a non-transitory computer-readable recording medium. An embodiment of the disclosure may include a non-transitory computer-readable storage medium having embodied thereon at least one program including instructions which, when executed by a processor, cause an electronic device to perform operations corresponding to the method of the electronic device, according to an embodiment of the disclosure.

The non-transitory computer-readable recording medium may include program commands, data files, data structures, and the like separately or in combinations. The program commands to be recorded on the computer-readable recording medium may be specially designed and configured for the disclosure or may be well-known to and usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are high-level language codes that can be executed by a computer using an interpreter or the like as well as machine language codes made by a compiler, e.g., a code made by a compiler or a code executable by an interpreter.

A recording medium or a storage medium may be provided as a non-transitory storage medium. The non-transitory storage medium is a tangible device and may not contain a signal (e.g., electromagnetic waves). This term does not distinguish a case in which data is stored semi-permanently in a storage medium from a case in which data is temporarily stored. For example, the non-transitory storage medium may include a buffer in which data is temporarily stored.

A method of operating an electronic device, according to an embodiment of the disclosure, may be provided in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store (e.g., Play Store™) or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

Example embodiments of the disclosure may be implemented as a computer program product including a recording medium having stored therein a program performing the operation method of the electronic device, according to an embodiment of the disclosure.

While the disclosure has been illustrated and described with reference various example embodiments, it will be understood that the various example embodiments are intended to be illustrative, not limiting. It will be further understood by those of ordinary skill in the art that various changes in form and detail may be made therein without departing from the true spirit and full scope of the disclosure, including the following claims and their equivalents. It will also be understood that any of the various embodiment(s) described herein may be used in conjunction with other embodiment(s) described herein.

What is claimed is:

1. A first electronic device comprising:
   a Wi-Fi module comprising circuitry including a first communication interface and a second communication interface, each of the first communication interface and the second communication interface being operable in a first mode as a Wi-Fi station and in a second mode for Wi-Fi Direct communication; and
   memory storing one or more programs, wherein the one or more programs are executable by at least one processor and include instructions for:
      setting an operation mode of the first communication interface to the first mode and an operation mode of the second communication interface to the second mode;
      establishing a first communication connection with a first access point (AP) through the first communication interface while the first communication interface operates in the first mode;
      setting an operation mode of the second communication interface to the first mode;
      establishing a second communication connection with a second AP included in a second electronic device through the second communication interface while the second communication interface operates in the first mode and while the first communication connection with thea first AP is maintained through the first communication interface; and
      transmitting data to the second electronic device using the second communication connection for enabling the second electronic device to establish a communication connection to the first AP.

2. The electronic device of claim 1, wherein the one or more programs include instructions for:
   searching for an AP; and
   changing the operation mode of the second communication interface from the second mode to the first mode, based on identifying an AP during the searching.

3. The electronic device of claim 1, wherein the one or more programs includes instructions for:
   scan searching for electronic devices including activated APs at specified time intervals; and
   based on identifying the second electronic device as an electronic device including an activated AP, changing the operation mode of the second communication interface from the second mode to the first mode.

4. The electronic device of claim 1, further comprising a user interface configured to receive an input,
   wherein the one or more programs include instructions for:
      scan searching for electronic devices including activated APs, based on an input received through the user interface, and
      based on identifying the second electronic device as an electronic device including an activated AP including the second AP, changing the operation mode of the second communication interface from the second mode to the first mode.

5. The electronic device of claim 1, further comprising a user interface configured to receive an input,
   wherein the one or more programs include instructions for:
      scan searching for electronic devices including activated APs, based on an input received through the user interface, and
      based on identifying the second electronic device as an electronic device including an activated AP, outputting a user interface screen image for a communication connection with respect to the second AP.

6. The electronic device of claim 1, wherein the one or more programs include instructions for:
   scan searching for electronic devices including activated APs using the first communication interface connected to the first AP,
   based on identifying the second electronic device as an electronic device including an activated AP, disabling a Peer-to-Peer (P2P) listen operation performed by the second communication interface to a stand-by communication connection based on Wi-Fi Direct, and
   changing the operation mode of the second communication interface from the second mode to the first mode.

7. The electronic device of claim 1, wherein the one or more programs include instructions for, based on the first communication interface being in the first mode and the second communication interface being in the second mode, searching for electronic devices including activated APs using the first communication interface.

8. The electronic device of claim 1, wherein the one or more programs include instructions for transmitting Wi-Fi connection information to the second electronic device.

9. The electronic device of claim 8, wherein the one or more programs include instructions for transmitting server registration information for the second electronic device to the second electronic device through the second communication connection.

10. The electronic device of claim 8, wherein the one or more programs include instructions for, based on completing transmitting of the Wi-Fi connection information, disconnecting the second communication connection.

11. The electronic device of claim 9, wherein the one or more programs include instructions for:
- based on disconnecting the second communication connection, changing the operation mode of the second communication interface from the second mode to the first mode,
- wherein the second communication interface is further configured to perform a Peer-to-Peer (P2P) listen operation to a stand by communication connection based on Wi-Fi Direct, in the second mode.

12. The electronic device of claim 2, wherein the one or more programs include instructions for, based on changing the operation mode of the second communication interface:
- performing a search for electronic devices having activated APs through the second communication interface, and
- based on identifying the second electronic device as an electronic device having an activated AP, establishing the second communication connection.

13. The electronic device of claim 1, wherein the first electronic device is configured to operate as a mediator within an Internet of Things (IOT) platform,
- the second electronic device is an enrollee electronic device to be registered in an IoT server to implement the IoT platform, and
- the first AP is or is connected to an enroller supporting communication between the IoT server and at least one of the first electronic device or the second electronic device.

14. The electronic device of claim 1, comprising a multiband AP device configured to perform Wi-Fi communication in each of a plurality of frequency bands.

15. A method of operating a first electronic device including a Wi-Fi module comprising circuitry including a first communication interface and a second communication interface, each of the first communication interface and the second communication interface being operable in a first mode as a Wi-Fi station and a second mode for Wi-Fi Direct communication, the method comprising:
- setting an operation mode of the first communication interface to the first mode and an operation mode of the second communication interface to the second mode;
- establishing a first communication connection with a first access point (AP) through the first communication interface while the first communication interface operates in the first mode;
- setting an operation mode of the second communication interface to the first mode;
- establishing a second communication connection with a second AP included in a second electronic device through the second communication interface while the second communication interface operates in the first mode and while the first communication connection with the first AP is maintained through the first communication interface; and
- transmitting data to the second electronic device using the second communication connection for enabling the second electronic device to establish a communication connection to the first AP.

16. The method of claim 15, comprising:
searching for an AP; and
changing the operation mode of the second communication interface from the second mode to the first mode, based on identifying an AP during the searching.

17. The method of claim 15, comprising:
scan searching for electronic devices including activated APs at preset time intervals; and
based on identifying the second electronic device as an electronic device including an activated AP, changing the operation mode of the second communication interface from the second mode to the first mode.

18. The method of claim 15, comprising:
receiving an input for requesting electronic device searching;
searching for electronic devices including activated APs, based on receiving the input; and
based on identifying the second electronic device as an electronic device including an activated AP, changing the operation mode of the second communication interface from the second mode to the first mode.

19. The method of claim 15, comprising:
scan searching for electronic devices including activated APs using the first communication interface connected to the first AP, based on receiving an input for requesting electronic device searching;
based on identifying the second electronic device as an electronic device including an activated AP, outputting a user interface screen image for a communication connection with respect to the second AP; and
based on receiving an input for communication connection to the user interface screen image, obtaining information necessary for connection with respect to the second AP.

20. The method of claim 15, comprising:
scan searching for electronic devices including activated APs using the first communication interface connected to the first AP;
based on identifying the second electronic device as an electronic device including an activated AP, disabling a Peer-to-Peer (P2P) listen operation performed by the second communication interface to a stand-by communication connection based on Wi-Fi Direct; and
changing the operation mode of the second communication interface from the second mode to the first mode.

* * * * *